(12) United States Patent
Kirchmann et al.

(10) Patent No.: US 12,472,478 B2
(45) Date of Patent: Nov. 18, 2025

(54) APPARATUS AND METHOD FOR EXAMINING HETEROGENEOUSLY CATALYZED REACTIONS

(71) Applicant: HTE GMBH THE HIGH THROUGHPUT EXPERIMENTATION COMPANY, Heidelberg (DE)

(72) Inventors: Marius Kirchmann, Heidelberg (DE); Kurt-Erich Finger, Heidelberg (DE); Markus Friess, Heidelberg (DE)

(73) Assignee: HTE GMBH THE HIGH THROUGHPUT EXPERIMENTATION COMPANY, Heidelberg (DE)

( * ) Notice: Subject to any disclaimer, the term of this patent is extended or adjusted under 35 U.S.C. 154(b) by 278 days.

(21) Appl. No.: 17/919,617

(22) PCT Filed: Apr. 19, 2021

(86) PCT No.: PCT/EP2021/060076
§ 371 (c)(1),
(2) Date: Apr. 3, 2023

(87) PCT Pub. No.: WO2021/213974
PCT Pub. Date: Oct. 28, 2021

(65) Prior Publication Data
US 2023/0226509 A1    Jul. 20, 2023

(30) Foreign Application Priority Data

Apr. 20, 2020 (EP) ..................................... 20170459
Oct. 14, 2020 (CN) ......................... 202011095513.7

(51) Int. Cl.
*B01J 8/18* (2006.01)
*B01D 45/08* (2006.01)
(Continued)

(52) U.S. Cl.
CPC ............ *B01J 8/1809* (2013.01); *B01D 45/08* (2013.01); *B01J 8/0065* (2013.01); *B01J 8/1863* (2013.01);
(Continued)

(58) Field of Classification Search
CPC ...... B01J 8/1809; B01J 8/0065; B01J 8/1863; B01J 8/1881; B01J 8/228; B01D 45/08; C10G 11/187
See application file for complete search history.

(56) References Cited

U.S. PATENT DOCUMENTS 5,266,270 A    11/1993    Ajot et al.
6,069,012 A    5/2000    Kayser
(Continued)

FOREIGN PATENT DOCUMENTS

CN    203816363 U    9/2014
CN    104028051 A    4/2016
(Continued)

OTHER PUBLICATIONS

English machine translation of CN 104028051 (Year: 2014).*
(Continued)

*Primary Examiner* — Renee Robinson
(74) *Attorney, Agent, or Firm* — Element IP, PLC

(57) ABSTRACT

The invention relates to an apparatus for analyzing heterogeneously catalyzed reactions comprising at least one reactor (3) through which a particulate catalyst flows and at least one reactant feed, wherein arranged downstream of each reactor (3) is a separation apparatus (17) for separating the particulate catalyst from a reaction product comprising condensable gases and arranged downstream of the separation apparatus (17) is a liquid separator (31) for separating liquid constituents from the reaction product, wherein the liquid separator (31) comprises a metallic tube (103) and a (Continued)

Figure 1:
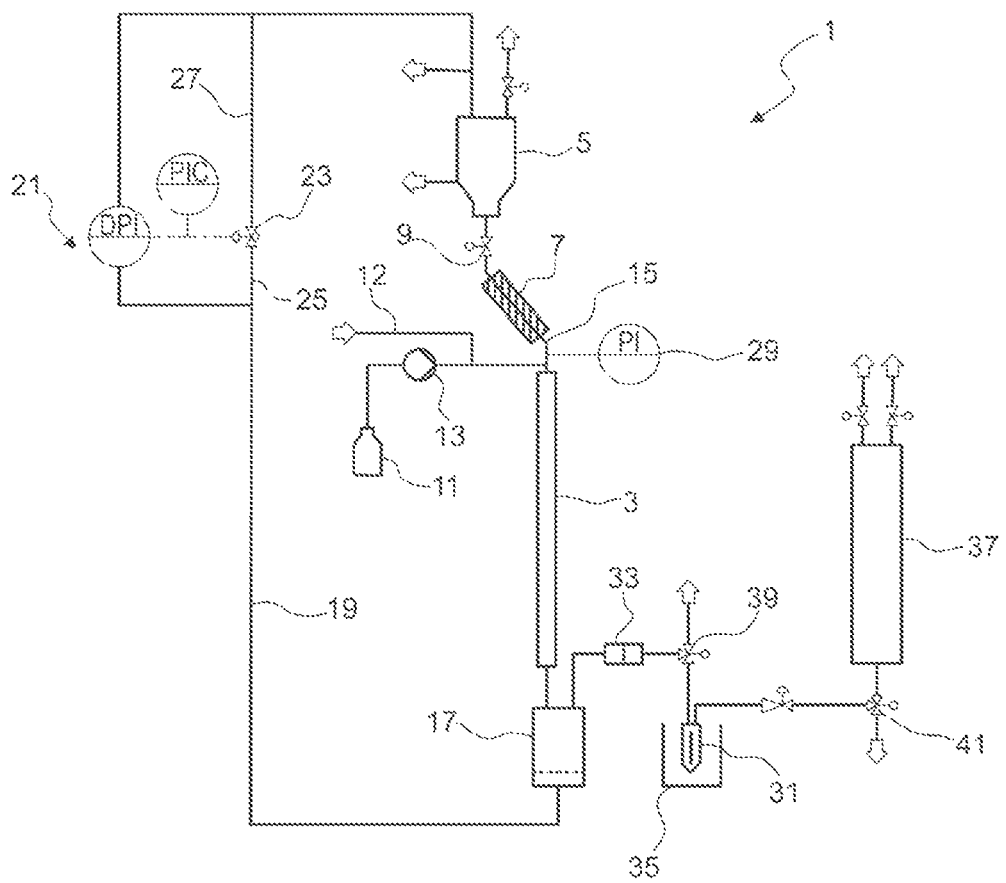

deflection body (119), wherein the metallic tube (103) is closed at its ends and the deflection body (119) is accommodated in the metallic tube (103) and the metallic tube (103) comprises a side feed (135) at a first end (105) and a gas outlet (113) at a second end (107) and the gas outlet (113) is connected to at least one sample vessel (37). The invention further relates to a process for analyzing heterogeneously catalyzed reactions in the apparatus.

17 Claims, 11 Drawing Sheets

(51) Int. Cl.
    *B01J 8/00*     (2006.01)
    *B01J 8/22*     (2006.01)
    *C10G 11/18*     (2006.01)
    *G01N 31/10*     (2006.01)

(52) U.S. Cl.
    CPC ............ *B01J 8/1881* (2013.01); *B01J 8/228* (2013.01); *C10G 11/187* (2013.01); *G01N 31/10* (2013.01); *B01J 2208/00539* (2013.01); *B01J 2208/00628* (2013.01)

(56) References Cited

U.S. PATENT DOCUMENTS

| | | |
|---|---|---|
| 7,378,059 B2 | 5/2008 | Canos et al. |
| 2003/0040116 A1 | 2/2003 | Canos et al. |
| 2005/0145542 A1 | 7/2005 | O'Connor et al. |
| 2019/0020655 A1 | 1/2019 | Takahiro |
| 2020/0139326 A1* | 5/2020 | Find ............... B01J 8/1881 |

FOREIGN PATENT DOCUMENTS

| | | | |
|---|---|---|---|
| CN | 205495157 U * | 8/2016 | ............ B01D 45/12 |
| DE | 10157664 A1 | 6/2003 | |
| WO | 2015141624 A1 | 9/2015 | |
| WO | 2016166153 A1 | 10/2016 | |
| WO | 2019020655 A1 | 1/2019 | |

OTHER PUBLICATIONS

English machine translation of CN 205495157 (Year: 2016).*
International Search Report for PCT/EP2021/060076 mailed Jul. 21, 2021 6 pages.

* cited by examiner

APPARATUS AND METHOD FOR EXAMINING HETEROGENEOUSLY CATALYZED REACTIONS

CROSS-REFERENCE TO RELATED APPLICATION(S)

The present application is a national stage entry under 35 U.S.C. § 371 of International Application No. PCT/EP2021/060076, filed on Apr. 19, 2021, which claims priority to European Patent Application No. 20170459.0 filed on Apr. 20, 2020 and Chinese Patent Application No. 202011095513.7 filed on Oct. 14, 2020, the contents of which are hereby incorporated by reference in their entirety.

DESCRIPTION

The invention proceeds from an apparatus for analyzing heterogeneously catalyzed reactions comprising at least one reactor through which a particulate catalyst flows and at least one reactant feed, wherein arranged downstream of each reactor is a separation apparatus for separating the particulate catalyst from a reaction product comprising condensable gases and arranged downstream of the separation apparatus is a liquid separator for separating liquid constituents from the reaction product. The invention further relates to a process for performing heterogeneously catalyzed reactions.

BACKGROUND

Heterogeneously catalyzed reactions that may be analyzed are in particular those having short contact times, preferably in the range from 0.1 to 10 seconds. Such reactions are, in particular, catalytic cracking reactions (Fluid Catalytic Cracking—FCC) which are performed on an industrial scale in so-called riser reactors in which the catalyst flows from bottom to top. Midsize industrial scale plants are typically provided with a catalyst volume of 100-200 metric tonnes. Good representation/simulation of the industrial scale FCC process can be realized with pilot plants that are equipped with riser reactors and are operated with catalyst volumes of 2 to 10 kg or more.

The experiments with pilot plants show good agreement with the industrial scale plants in terms of catalytic conversion but are more costly and complex to operate than laboratory plants which may be operated with catalyst amounts in the range from 1 to 50 g. For representation of an industrial scale plant a process should be performable on the laboratory scale with the smallest possible amounts of catalyst. At the same time the technical operating parameters should agree with the operating parameters of the industrial scale plant with the highest possible accuracy. These operating parameters include, in particular, temperature, contact time, catalyst loading (Weight Hourly Space Velocity—WHSV), catalyst-to-feed ratio and pressure.

The prior art discloses varies apparatuses for analyzing heterogeneously catalyzed reactions with solid catalysts, such as are also used in FCC processes for example. A distinction must be made here as to whether the catalyst was used in the form of a fixed bed or a fluidized bed. The test unit with a fixed bed catalyst is described, for example, in ASTM D-3907 from 1987. A laboratory unit with a fluidized catalyst bed is described, for example, in U.S. Pat. No. 6,069,012, and a downstream flow reactor in WO-A 2019/020655.

Further apparatuses for analyzing catalysts, in particular for FCC processes, are described in US-A 2003/0040116 or U.S. Pat. No. 7,378,059. The apparatus described in US-A 2003/0040116 includes a reaction block with a set of reaction chambers and the reaction chambers can be filled with a catalyst. The catalyst is in the form of a fixed bed. In contrast to this, the apparatus described in U.S. Pat. No. 7,378,059 employs a reactor through which a particulate catalyst flows from top to bottom. The apparatus described here is particularly suitable for analyzing rapidly deactivating catalysts.

In order to be able to perform analyses of reaction mixtures, samples are typically taken during the reaction. For this purpose, for example, DE 101 57 664 A1 discloses using a sampling apparatus comprising a cylinder with a piston movable therein. In order to prevent gases deleterious to the reaction from penetrating into the reactor, or gases from escaping from the reactor, the apparatus is connected to the reactor by a valve by means of which the outlet from the reactor can be closed or a connection from the reactor to the sampling apparatus or a connection from the sampling apparatus to an outlet can be opened.

A disadvantage of all of the processes known from the prior art is that the sampling of reactions at comparable times or the analysis of reaction parameters over the course of the reaction, especially of those that cannot be measured continuously but rather require evaluation of the sample over a particular period of time, is possible only with difficulty. It is also difficult to perform serial studies and take samples at comparable times with the known apparatuses. A further disadvantage is that the liquid separators customary in the laboratory cannot be used at pressures above 1 bar, so that analysis of the condensable or liquid components present in the reaction product is possible only with difficulty.

SUMMARY OF THE INVENTION

It is therefore an object of the present invention to provide an apparatus and a process which do not exhibit the disadvantages known from the prior art.

DETAILED DESCRIPTION OF THE INVENTION

This object is achieved by an apparatus for analyzing heterogeneously catalyzed reactions comprising at least one reactor through which a particulate catalyst flows and at least one reactant feed, wherein arranged downstream of each reactor is a separation apparatus for separating the particulate catalyst from a reaction product comprising condensable gases and arranged downstream of the separation apparatus is a liquid separator for separating liquid constituents from the reaction product, wherein the liquid separator comprises a metallic tube and a deflection body, wherein the metallic tube is closed at its ends and the deflection body is accommodated in the metallic tube and the metallic tube comprises a side feed at a first end and a gas outlet at a second end and the gas outlet is connected to at least one sample vessel.

The object is further achieved by a process for analyzing heterogeneously catalyzed reactions comprising:
(a) adding liquid and/or gaseous reactants and a particulate catalyst to each of the reactors of the apparatus for analyzing heterogeneously catalyzed reactions;
(b) reacting the liquid and/or gaseous reactants in the presence of the particulate catalyst in each reactor to form a gaseous reaction product comprising condensable and/or liquid components;
(c) separating the particulate catalyst from the gaseous reaction product comprising condensable and/or liquid components;
(d) optionally cooling the gaseous reaction product comprising condensable and/or liquid components to condense the condensable components;
(e) separating the condensed and/or liquid components in the liquid separator;
(f) withdrawing a sample of the gaseous reaction product into the sample vessel after separation of the condensed and/or liquid components at a predetermined time, wherein a sample is withdrawn or pulsed withdrawal of samples is effected from the gaseous reaction product of each reactor at the predetermined time, wherein each withdrawal pulse introduces a sample of the gaseous reaction product into a new sample vessel;
(g) analyzing the samples present in the sample vessels;
(h) optionally weighing the liquid separators to determine the mass of the separated condensable and/or liquid components.

The connection of a reactor to at least two sample vessels makes it possible to perform analyses irrespective of the time at which the sample was taken. More particularly, it is possible to take samples at defined times and also to perform analyses thereon that take longer than the intervals between two sampling times. In the case of an apparatus having more than one reactor, in which each reactor is connected to at least one sample vessel, it is possible using appropriately switchable valves to withdraw a sample from each reactor at the same time. It is possible here to perform the same reaction in all reactors in order thus also to detect fluctuations in the progression of the reaction, or alternatively to perform a reaction with altered parameters in each reactor, in order to examine the influence of changes in reaction parameters on the reaction in this way. For this purpose too, it is necessary for the sampling to take place at the same time in each case. If time dependence is additionally also to be examined, at least two sample vessels in each case are connected to each reactor even in the apparatus having multiple reactors. The connection of each reactor to at least two sample vessels, preferably to at least four sample vessels, more preferably to at least eight sample vessels and especially to at least sixteen sample vessels makes it possible to withdraw one sample at each predetermined time over the course of the reaction and to analyze these independently of the progression of the reaction. The maximum number of sample vessels is defined by the build space available and the size of the sample vessels. Preferably, the maximum number of sample vessels for each reactor is 100, especially 50. If a larger number of samples is to be taken than sample vessels are connected to the reactor, it is also possible to connect the sample vessels to the reactor in such a way that these can be removed after the sample has been taken during the performance of the reaction, and replaced by a new, empty sample vessel. In the case of fixedly installed sample vessels, it is alternatively possible to connect these to a suitable valve that permits transfer of the sample present in the sample vessel to a further vessel after sampling. In this case, for analyses that are each intended to give results at a particular time in the reaction, it is possible to transfer the samples individually to small analysis vessels. If an average over the reaction time is to be detected, the samples captured individually may also be collected in a larger vessel and mixed therein, in which case the analyses are performed on the mixture thus collected.

If controllable valves are used for the connection of the sample vessels to the reactor, it is possible to take samples in an automated manner. If controllable valves have a suitable interface, it is also possible to control sampling online by means of suitable input devices, such as process control systems, computers, smartphones or tablet computers connected to the interface.

The construction of the liquid separator with a metallic tube also allows use thereof at high pressures and temperatures. In addition, the separation of liquid components in laboratory units may be carried out at substantially higher pressures than when using customary laboratory apparatuses which are generally made of glass.

Liquid droplets present in the gaseous reaction product are deposited on the deflection body inside the metal tube and form larger droplets which flow down the deflection body or detach from the deflection body and fall into a collection space for liquid components, from which the liquid components may be withdrawn from the liquid separator.

The construction of the liquid separator with a metallic tube and a deflection body positioned inside the metallic tube achieves an effect of the liquid separator which corresponds to that of known laboratory apparatuses made of glass which cannot be produced from metal in the same way.

To allow continuous supply of the catalyst to the reactor it is preferable when a catalyst reservoir container, from which the particulate catalyst may be supplied to the reactor via a metering point, is present. The use of a catalyst reservoir container has the further advantage that the catalyst can be preheated and thus, for example, supplied to the reactor at a constant temperature. It is also possible to regenerate the catalyst in the reservoir container, wherein this may require that suitable regeneration substances be supplied. To allow uniform temperature control and optionally uniform regeneration of the particulate catalyst in the catalyst reservoir container it is further possible to employ means for mixing the particulate catalyst. Suitable means for mixing are, for example, stirrers or a gas with which the catalyst is fluidized. The gas used for this purpose may be inert or a gas which promotes the regeneration of the catalyst. Suitable inert gases are, for example, nitrogen, carbon dioxide or noble gases. Suitable gases that promote the regeneration of the catalyst depend on the type of catalyst employed and are known to those skilled in the art. The catalyst reservoir may additionally be connected to a vibration means. The vibration causes the catalyst to form a uniform surface and any lumps present which could block the outlet are broken up. This has the further advantage that the particulate catalyst may be uniformly withdrawn from the catalyst reservoir container and no catalyst remains adhered to the walls of the catalyst reservoir container.

Means for temperature control of the catalysts may be any suitable means with which the catalyst may be heated or cooled, for example a double wall, or a tube inside the catalyst reservoir container, having a temperature control medium flowing through it. The catalyst in the catalyst reservoir container is preferably preheated in particular for analysis of reactions performed at high temperatures. This may be achieved using any desired heating elements, for example a double wall having a heating medium flowing through it or a pipe conduit inside the catalyst reservoir container having a heating medium flowing through it. Further suitable heating elements are, for example, electrical heating elements, induction heating elements or a hot gas flowing through the particulate catalyst.

To allow withdrawal of the particulate catalyst from the catalyst reservoir container the lower end of the catalyst reservoir container preferably has a funnel shape. The end of the tunnel is connected to an outlet conduit which has only a small diameter, wherein the diameter of the outlet conduit is preferably less than 2 mm. The outlet conduit is preferably connected to a gas conduit, through which gas is permanently passed into the outlet conduit. The permanent supply of gas keeps the catalyst in the outlet conduit in a fluidized state, thus avoiding blockages. A common conduit leads from the connection point of the outlet conduit and the gas conduit to the inlet of the reactor. In order to start and stop catalyst supply into the reactor the common conduit preferably has a valve arranged in it. If reactions at high temperatures are to be analyzed the valve is preferably a high temperature valve. The diameter of the outlet conduit influences the metering rate of catalyst. Further parameters by which the catalyst metering rate is influenced result from the size of the differential pressure, the gas velocity and the catalyst characteristics. If the catalyst storage tank is funnel-shaped, the use of the vibration apparatus has the further advantage that faster flowing of the particulate catalyst above the outlet opening out of the catalyst reservoir container and into the outlet conduit, and thus formation of a conical depression, is prevented. Said depression can lead to uncontrolled gas breakthrough, thus preventing uniform catalyst metering.

As an alternative to the funnel-shaped design of the catalyst reservoir container it is also possible for controlled transfer of the particulate catalyst from the catalyst reservoir container into the reactor to employ for example a conveying screw which conveys the particulate catalyst from the catalyst reservoir container into the reactor in a controlled manner. It is important that the catalyst reservoir container is filled with a sufficient amount of catalyst, such that the vessel is not completely emptied during performance of the process according to the invention.

In order to be able to analyze reactions that are to be performed at certain pressures, in particular reactions that are performed at high pressure, for example catalytic cracking reactions such as fluid catalytic cracking (FCC), it is preferable when an outlet conduit from the separation apparatus, through which the gaseous reaction product flows after separation of the particulate catalyst, comprises a continuously acting valve which is connected via a controller to a pressure sensor, wherein the continuously acting valve and the pressure sensor form a pressure control loop with a controller.

It is preferable when, as described in WO-A 2019/020655, the catalyst reservoir container and the separation apparatus have a functional connection provided with a differential pressure controller that actuates a continuously acting valve, wherein the outlet side of the continuously acting valve has either a connecting conduit to the separation apparatus or an exhaust air conduit. If the outlet side of the continuously acting valve has an exhaust air conduit the separation apparatus comprises a gas feed and the portion of the functional connection from the separation apparatus to the differential pressure controller is connected to the pressure sensor of the differential pressure controller.

The differential pressure controller makes it possible to establish a defined pressure gradient between the catalyst reservoir container and the reactor. In this preferred embodiment, the pressure gradient serves as a driving force for transferring the catalyst from the catalyst reservoir container into the reactor. The pressure control circuit comprises a continuously acting valve having an inlet and an outlet, wherein the inlet is functionally connected to the catalyst reservoir container and the outlet to the separation apparatus or the gas feed thereof. It is alternatively also possible for the outlet of the continuously acting valve of the differential pressure controller to be functionally connected to the exhaust air conduit. The continuously acting valve is actuated by a differential pressure controller, wherein the differential pressure controller takes its actual values from the inside of the catalyst reservoir container and from a region directly connected to the reactor.

Preferably arranged in the output conduit from the separation apparatus is a further pressure controller whose continuously acting valve is actuated by a controller. The actual value of the control circuit is preferably captured in the conduit between the separation apparatus and the continuously acting valve.

The pressure control system is preferably configured as a main flow control system.

It is alternatively also possible to provide a secondary flow control system in the outlet conduit from the separation apparatus, wherein in this case the actual value is captured from the conduit between the continuously acting valve and the sample vessel and a gas feed conduit opens into the conduit downstream of the capturing point.

The term "control circuit" also encompasses a relief valve or membrane relief valve.

Individual elements of the apparatus may be provided with pressure relief valves. If excess pressure occurs within the apparatus the pressure relief valves can prevent damage to the apparatus. The catalyst reservoir container and the separation apparatus are preferably provided with a pressure relief valve.

It is preferable when the continuously acting valve in the pressure controller is functionally connected to a pressure sensor, wherein this functional connection leads to the inlet region of the reactor, to the outlet region of the reactor or to the outlet conduit to the product flow outlet. It is additionally preferable when the continuously acting valve in the pressure controller is functionally connected to the product flow outlet; more preferably, the continuously acting valve is a constituent of the pressure controller.

The continuously acting valve arranged in the outlet conduit must be connected to a pressure sensor via a controller in order to form a controller. The actual pressure value is obtainable from the region of the gas feed to the separation apparatus, from the region of the reactor inlet or from the region of the outlet conduit which is arranged downstream of the separator. The actual pressure value is alternatively obtainable by a functional connection from the conduit region between the outlet of the reactor and the separation apparatus.

In order to allow reuse of the catalyst it is possible for a catalyst circuit to be present, so that the catalyst separated in the separation apparatus may be returned to the metering point at the inlet into the reactor. It is particularly advantageous for the catalyst reservoir container to be arranged in the catalyst circuit. However, it is alternatively also possible to initially withdraw the catalyst from the separation apparatus. The withdrawn catalyst may then optionally be regenerated and returned to the catalyst reservoir container.

If the apparatus comprises more than one reactor it is possible to connect each reactor with a separate catalyst reservoir container or to provide a common catalyst reservoir container for all reactors. However, it is preferable to connect each reactor to a catalyst reservoir container. Since when using a plurality of reactors different influencing variables are generally to be analyzed it is also preferable to provide each reactor with a dedicated pressure control.

The reactor employed in the apparatus according to the invention for analyzing heterogeneously catalyzed reactions is preferably a tubular reactor. Said reactor is preferably aligned at an angle in the range from 45° to 90° to the horizontal, wherein the particulate catalyst may flow through the tubular reactor from top to bottom or from bottom to top. The tubular reactor is more preferably aligned at an angle of 30° to 90° to the horizontal, further preferably at an angle in the range from 80° to 90° to the horizontal and in particular at an angle in the range from 85° to 90° to the horizontal. The reactor is very particularly preferably vertical, i.e. aligned at an angle of 90° to the horizontal within measurement accuracy.

The reactor in the form of a tubular reactor preferably has a length in the range from 0.3 to 3 m, more preferably from 0.5 to 2.5 m. The diameter of the reactor is preferably in the range from 3 to 100 mm, more preferably in the range from 5 to 50 mm and in particular in the range from 6 to 20 mm. In addition to a cylindrical configuration of the tubular reactor a descending helically coiled configuration of the reaction tube is also possible.

In addition to a configuration such that the catalyst flows through the reactor from top to bottom it is also possible for the catalyst to flow through the reactor from bottom to top. In this case it is particularly advantageous for the catalyst container to be connected to the metering point via a pipe arc having a radius of 25 to 75 mm. In the pipe arc the catalyst is preferably deflected by at least 90°, particularly preferably by 180°, wherein the particulate catalyst flows downwards out of the catalyst reservoir container and is deflected by the pipe arc in such a way that it can flow into the reactor from below parallel to the tube axis of the reactor in the form of a tubular reactor.

The catalyst reservoir container used for storing the particulate catalyst preferably has a catalyst capacity in the range from 0.1 to 5 liters, more preferably in the range from 0.2 to 3.5 liters. In the case of FCC catalysts, the poured density is in the range of about 0.9 g/cm³. Therefore—depending on the configuration of the container—the catalyst reservoir container may accommodate about 0.1 to 4.5 kilograms of catalyst. The analysis of the heterogeneously catalyzed reaction is generally performed such that the duration of the catalyst supply is in the range from about 30 to 300 seconds, wherein the catalyst metering rate is preferably in the range from 30 to 150 g/min.

The process for analyzing heterogeneously catalyzed reactions is preferably performed such that on condition the process is performed in a configuration with downwardly transported catalyst the mass ratio of catalyst to liquid or gaseous reactant is in the range from 1 to 100. The ratio of catalyst to reactant is more preferably in the range from 2 to 30 and in particular in the range from 3 to 15. On condition the process is performed in a configuration with upwardly transported catalyst the mass ratio of catalyst to reactant is preferably in the range from 1 to 20. It is preferable when a series of experiments can be undertaken with, respectively, one charge of the catalyst reservoir container and one charge of a reservoir container for the liquid reactants, where all said experiments are performed by the process according to the invention. The metering of the liquid or gaseous reactant is preferably carried out via program control, wherein the amount of reactant metered in is simultaneously captured. The amount of particulate catalyst supplied may be determined with a calibration of the metering apparatus for the catalyst or by weighing the catalyst separated in the separation apparatus.

In a preferred embodiment, each reactor is provided more than one catalyst reservoir container. This has the advantage that the individual catalyst reservoir containers may be filled with catalyst during operation of the apparatus. The catalyst reservoir containers filled with catalyst here are the ones that are not being used for the metering at this time. The use of a plurality of catalyst reservoir containers for each reactor has the further advantage that a larger amount of catalyst may be supplied to the reactor since addition of the catalyst may be undertaken simultaneously from two or more catalyst reservoir containers.

The apparatus according to the invention may in particular be used for analyzing heterogeneously catalyzed reactions operated at a temperature in the range from 50° C. to 1200° C. and in particular at temperatures in the range from 250° C. to 800° C. When the reactions to be studied are catalyzed cracking reactions, for example FCC reactions, the reaction is typically performed at temperatures between 490° C. and 560° C.

Especially in the case of endothermic reactions such as catalyzed cracking reactions it is necessary to supply the energy required for the reaction. This is preferably effected by heating the catalyst in the catalyst reservoir container. For further supply of heat it is possible to connect the catalyst reservoir container to the reactor via a preheating zone, wherein further heat is supplied in the preheating zone. The catalyst is preferably preheated to a temperature in the range from 500° C. to 800° C., in particular in the range from 600° C. the 700° C., in the catalyst reservoir container and further heated to a temperature up to 1200° C., preferably up to 1100° C., in the preheating zone.

In order to be able to perform reactions at these temperatures it is preferable when in particular the catalyst reservoir container including the catalyst feed into the reactor, the reactor, the reactant feed, the separation apparatus, the liquid separator, the sample vessels and all conduits transporting the catalyst, liquid reactant and gaseous product can be temperature-controlled. When performing exothermic reactions it is advantageous to be able to cool the reactor in order to be able to remove heat liberated during the reaction. For the analysis of endothermic reactions, supply of heat and thus heating is required. Any means known to those skilled in the art can be used for temperature control. Thus for example the individual elements of the apparatus may be provided with a double wall, through which a temperature control medium is passed. Heating may in particular also be effected using electrical heating or inductive heating.

The reactor is particularly preferably provided with a plurality of temperature control zones which can be temperature-controlled separately.

Reactions that may be analyzed with the apparatus according to the invention of the process according to the invention are in particular those where gaseous and/or liquid reactants are employed. It is particularly preferable when the reaction affords a gaseous reaction product which, however, may still comprise liquid or condensable components.

The process and the apparatus are particularly preferably used for analyzing reactions employing reactants that are in the liquid state in a temperature range from 25° C. to 250° C. The liquid starting materials used are particularly preferably selected from the group of oils, heavy oils, VGO, residual oils, bio-oils, pyrolysis oils, peat oil, gasoline, diesel and naphtha. In further embodiments, gaseous reactants or mixtures of gases and liquids are used.

In addition to the abovementioned catalytic cracking reactions the apparatus according to the invention and the process according to the invention may also be used for analyzing the conversion of gaseous reactants into chemical value products, for example the conversion of ethane into ethene, the conversion of propane into propene or the conversion of synthesis gas into methanol.

The apparatus and the processes are further also suitable for analysis of steam reforming, analyses under steamcracking conditions of hydrocarbons and in particular heavy inputs (so-called heavy feeds), of inputs to value products (the so-called crude-to-chemicals process), of FCC processes under extremely hard process conditions (so-called high-severity FCC), simulation of industrial scale downwardly transporting fluidized bed processes, of unconventional inputs (biomass, algae slurry, sugar- and/or cellulose-containing materials, lignin), naphtha inputs and residual oils and inputs comprising blends of hydrocarbon-containing solids, analyses for workup of molten polymer materials (for example polyethylene), for pyrolysis of plastics by the so-called ChemCycling process.

The apparatus according to the invention and the process according to the invention also make it possible to perform analyses at temperatures above 800° C., preferably above 900° C., more preferably above 1000° C. When performing the process in the high temperature range, for example at temperatures above 900° C., the pulverulent catalyst employed may be a pulverulent heat transfer medium which is, for example, in the form of quartz particles or aluminum oxide particles. The function of the pulverulent heat transfer medium is to introduce the thermal energy required to perform the process into the reactor.

The process may comprise a program control for controlling the apparatus and/or an evaluation program for analyzing the measured data. The data evaluation is preferably performed in an at least partially automated manner; more preferably data evaluation is carried out fully automatically and integrated into the program for evaluation.

The analytical instruments used are preferably gas chromatographic analytical methods. The gas chromatographic analytical method also allows a detailed analysis of PIANO, including the RON determination of the gasoline fraction or lighter fractions. In addition or instead of gas chromatographic analysis units, the apparatus and the process may also comprise HPLC analytical instruments. should The process according to the invention may be used either for analyzing fresh catalysts or for analyzing deactivated catalysts. The program control preferably also includes a database in which all process parameters of the process are stored. Also stored in the database are the data for the analyses, so that the individual process parameters may be related to the analytical data. The database preferably assists with the evaluation of the analytical results using algorithms that allow pattern recognition. The data relating to analytical results and process parameters are stored in such a way that they are made available as comparative data.

The reaction product formed during the reaction may comprise not only gaseous components but also liquid components or reactant unconverted during the reaction. For analysis of the reaction product it is preferable to separate the components present in the reaction product. To separate liquid components or condensable components the liquid separator is employed. Especially for separation of condensable components it is preferable to cool the gaseous reaction product before entry into the liquid separator or in the liquid separator, so that the condensable components can condense and be separated from the gaseous reaction product as liquid.

Cracking of oils causes coke to form on the surface of the catalyst or coke to be deposited. The heavier the feed oil, the higher the tendency for coke formation. For regeneration the catalyst is contacted with an oxygen-containing gas stream. The burning off of the coke that may be undertaken after stripping off of the hydrocarbons may be performed either inside or outside the separation apparatus.

In order to minimize the failure proneness of the preferably employed pressure controller the pressure controller is particularly preferably positioned downstream of the liquid separator. This ensures that only the gaseous portion of the reaction product is passed through the valve of the pressure regulator.

The construction of the liquid separator with the metal tube and the deflection body makes it possible to separate the liquid or condensable components from the gaseous reaction product even at high pressures and high temperatures.

The deflection body may be made of any suitable material that is resistant to the temperatures that can occur during use of the liquid separator. Suitable materials for the deflection body are, for example, glass, ceramics or metals, in particular metals. It is particularly preferable to manufacture the metallic tube and the deflection body from the same metal.

Suitable metals for the metallic tube and, if made of metal, for the deflection body are for example cast iron or steel, in particular stainless steel, aluminum, brass or copper. Stainless steel is particularly preferred, especially since fittings and tubes made of stainless steel are commercially available.

The deflection body preferably comprises a central axis and 1 to 20 deflection plates, more preferably 1 to 10 deflection plates and in particular 3 to 6 deflection plates.

To separate condensable components from the gaseous reaction product, it is necessary to first condense the condensable components and then to separate said components from the gaseous reaction product. This is preferable especially when the gaseous reaction product comprises components which are still gaseous upon entry into the liquid separator on account of the temperature of the gaseous reaction product. In order to condense these components it is preferable to cool the liquid separator. To this end the liquid separator may be introduced into a cooling bath for example. Employable cooling liquids are either a cooling medium that remains liquid during operation of the liquid separator or that evaporates while the gaseous reaction product cools. Irrespective of whether a cooling medium that remains liquid during or that evaporates is used it is preferable when cooling medium flows through the cooling bath and may be cooled in a separate heat exchanger to dissipate the heat absorbed by the gaseous reaction product. Especially when the cooling medium is at least partially evaporated it is preferable to employ a cooling bath that is tightly sealed relative to the environment, for example by a cover and a suitable seal.

In addition to using a cooling bath it is also possible to provide the liquid separator with a double wall, through which the cooling medium can flow.

Especially when a cooling bath is employed it is preferable when the liquid separator comprises a feed conduit that is connected to the side feed and wraps helically around the metallic tube. In this case the feed conduit too is arranged in the cooling bath and the gaseous reaction product is already cooled in the feed conduit, so that the condensable components begin to condense. This has the result that a biphasic stream comprising a gaseous phase and liquid components is introduced into the metallic tube.

The deflection body is preferably configured such that the axis and the side of the deflection plates pointing to the first end enclose an angle in the range from 30° to 90°, more preferably in the range from 60° to 90° and in particular of 90°. This angle causes the gaseous reaction product flowing from the first end to the second end to be deflected as it approaches the baffles and droplets present in the reaction product, as a result of their inertia, impact the baffles, on which they agglomerate into larger droplets. The larger droplets drip off the baffles and collect at the first end of the liquid separator.

Especially when the deflection body has more than one deflection plate it is further preferable when the axis and the side of the deflection plates pointing to the second end enclose an angle in the range from 90° to 150° and in particular in the range from 90° to 120°. An angle of more than 90° causes liquid droplets falling on the deflection plate to flow outwards to the edge of the deflection plate and from there fall downwards, so that these too collect at the first end of the liquid separator.

For sufficient separation of the liquid components from the gas stream it is preferable when a gap in the range from 0.05 to 1 mm, more preferably in the range from 0.2 to 0.8 mm and in particular in the range from 0.4 to 0.6 mm is formed between each deflection plate and the inner wall of the metallic tube. Such a gap accelerates the gaseous reaction product flowing around the deflection plates and only a very small portion of the gaseous reaction product flows directly upwards without being deflected by the deflection plates. Thus only a very small proportion of the liquid components is entrained with the gaseous reaction product flowing around the deflection plates and does not impact the deflection plates and accumulate there. At least a portion of the liquid components that are entrained with the gaseous reaction product and flow around a deflection plate are deposited on a subsequent deflection plate. For this reason, a deflection body having more than one deflection plate, each configured such that the gap between the baffle plate and the inner wall of the metallic tube is in the abovementioned range, makes it possible to remove the liquid components from the gaseous reaction product almost completely or even completely.

To remove the liquid components from the gaseous reaction product almost completely or even completely, it is further necessary for the distance between two baffles to be sufficiently large that the gaseous reaction product flows into the entire region between the deflection plates and that dead spaces, in which vortices form and thus no fresh gaseous reaction product enters, are avoided. Such dead spaces result, for example, from a substantially laminar flow of the gaseous reaction product parallel to the wall of the metallic tube. This results in entrainment of the liquid components which are not deposited on the baffle plates. The required distance between the deflection plates depends on the diameter of the metal tube, the volume flow of the gaseous reaction product and the width of the gap between the deflection plates and the inner wall of the metallic tube. It is particularly preferable when the ratio of the distance between the outer edge of two adjacent deflection plates and the internal diameter of the metallic tube is in the range from 15 to 1, more preferably in the range from 10 to 1 and in particular in the range from 8 to 2. At such a distance between two deflection plates the ratio of the length of the metallic tube to the internal diameter of the metallic tube is in the range from 1 to 125, preferably in the range from 5 to 50 and in particular in the range from 5 to 25.

The internal volume of the liquid separator is preferably in the range from 1 to 1000 ml, more preferably in the range from 5 to 500 ml and in particular in the range from 5 to 100 ml. The liquid separator may be employed at pressures in the range from 0.01 to 50 bara, more preferably in the range from 0.1 to 20 bara and in particular in the range from 1 to 15 bara. This has the advantage that the pressure of the gaseous reaction product does not need to be reduced after leaving the reactor and before entering the liquid separator. As a result of the materials employed the liquid separator may be employed at a temperature in the range from −50° C. to 200° C., more preferably in the range from −20° C. to 180° C. and in particular in the range from −10° C. to 100° C.

Since it cannot be ruled out that a small portion of the liquid components is entrained with the gaseous reaction product and is not deposited on the deflection plates, the liquid separator preferably comprises a droplet separator positioned between the deflection body and the gas outlet. The droplet separator may be any suitable droplet separator, for example a filter that only allows passage of gaseous components. However, it is particularly preferred when the droplet separator is made of fibers forming a fiber pad. The droplet separator is particularly preferably made of glass wool. However, also suitable as a material for the fiber pad, in addition to glass, are quartz wool and synthetic fibers that are resistant to the liquid and gaseous components in the reaction product. It is particularly preferable to employ a droplet separator if it is to be prevented that a portion of the liquid components is emitted to the environment and/or that the pressure control valve is to be protected from accumulation of the liquid or when the total amount of the liquid is to be detected.

To facilitate production of the liquid separator and allow cleaning after use it is preferable to make the liquid separator dismantleable. For this purpose it is possible, for example, for the metallic tube to be closed at the first end. The second end is then preferably closed with a removable cover and the gas outlet is formed in the removable cover. From there the liquid may either be sucked or tipped out.

It is alternatively also possible for the metallic tube to be closed at the second end and closed with a removable cover at the first end. In this case the gas outlet is arranged at the closed second end and the cover with which the first end may be closed preferably comprises a liquid outlet.

In addition to the variants having a closed end and an end closed with a cover, it is further possible to close the first end with a cover in which a liquid outlet is preferably formed and the second end with a cover in which the gas outlet is arranged.

The removable cover may be secured for example using an internal thread or an external thread on the metallic tube. It is further also possible to secure the cover to the metallic tube for example with a bayonet closure or using a clamp or clip. It is particularly preferable to screw the removable cover onto the metallic tube with an external thread on the metallic tube and a corresponding internal thread on the cover of the metallic tube.

In order to seal connection between the removable cover and the metallic tube it is preferable when a sealing element is positioned between the metallic tube and the removable cover. The sealing element is particularly preferably an O-ring. Such a media-tight connection makes it possible to operate the apparatus at pressures of up to 50 bara.

In addition to the detachable connection of the cover to the metal pipe the cover may also be non-detachably connected to the metallic tube, for example by soldering, welding or adhesive bonding. However, since such a non-detachable connection has the result that the liquid separator cannot be opened for cleaning this is only sensible when no components can contaminate the liquid separator. It is therefore preferable to provide the liquid separator with at least one removable cover.

The droplet separator is preferably positioned on the inlet side of the gas outlet and is secured with the axis of the deflection body Especially when the metallic tube is closed with a removable cover at the second end it is preferable when the droplet separator is positioned in the removable cover and secured with the axis of the deflection body. By positioning the droplet separator in the removable cover and securing with the axis of the deflection body the droplet separator remains in its position during operation of the liquid separator. In addition, the droplet separator can be easily replaced by opening the removable cover when said separator is saturated with liquid or blocks the gas outlet due to deposits. The positioning of the droplet separator at the upper end of the metallic tube has the further advantage that liquid deposited in the droplet separator can drain to the first end of the liquid separator.

Especially when the reactions to be analyzed are performed at pressures above or below ambient pressure it is preferable to close the liquid outlet with a suitable valve. When the liquid separator is filled with liquid at the first end the valve can be opened to withdraw the liquid.

If the liquid is to be recycled into the process the liquid outlet may be connected to a recycle conduit. In this case it is necessary to provide a valve at the liquid outlet since the liquid can drain directly out of the liquid separator and be recycled into the process.

The gas outlet may be connected to a collector, for example a gas burette or a pneumatic cylinder, to collect the gaseous reaction products from which the liquid component have been removed. The gaseous reaction product may also be supplied to a flow meter to measure the volume flow. Irrespective of whether the gaseous reaction product was initially collected in a collector or has flowed through a flow meter, the gaseous reaction product is at least partially collected in at least one sample vessel after separation of the liquid components. An advantage of the sample vessel is that, in contrast to a water burette, the sample vessel does not contain any liquid medium. The presence of a liquid medium can lead to disruptive effects impairing the accuracy of the process, for example if water-soluble gas fractions of the gaseous reaction product remain in the water and are thus not available for evaluation.

The liquid separator makes it possible to determine the amount of liquid components separated from the gaseous reaction product. This may be done using a precision balance for example. Such a precision balance typically has a measurement accuracy of less than ±100 mg, more preferably less than ±10 mg and in particular ±1 mg. It is preferable to employ a precision balance having a measurement range of up to 30 kg or up to 5 kg. The measurement range of the precision balance in particular depends on the mass of the liquid separator. To determine the liquid components separated from the gaseous reaction product the empty liquid separator is weighed before commencement of the experiment. A further weighing takes place after termination of the experiment. The mass differential corresponds to the mass of the liquid components separated from the gaseous reaction product.

If the density of the liquid components is known, the volume of the liquid components can then also be determined from the mass using the density.

If a plurality of reactors are employed it is particularly preferable when each reactor is connected to a liquid separator since this is the only way to analyze the reactions carried out in the individual reactors.

To analyze the gaseous reaction product said product is at least partially accommodated by a sample vessel after separation of the liquid and/or condensable components. The gaseous reaction product received in the sample vessel may then be analyzed in respect of its composition for example.

In order to allow performance of several analyses simultaneously or taking of several samples consecutively it is preferable when in an apparatus having one reactor the reactor is connected to at least two sample vessels and in an apparatus having more than one reactor each reactor is connected to at least one sample vessel.

In order to analyze the gaseous reaction product a sample of the gaseous reaction product is introduced into the sample vessel after separation of the condensed and/or liquid components at a predetermined time, wherein a sample is withdrawn or pulsed withdrawal of samples is effected from the gaseous reaction product of each reactor at the predetermined time, wherein each withdrawal pulse introduces a sample of the gaseous reaction product into a new sample vessel;

In order to prevent the sample vessel from also containing impurities as well as the reaction product to be analyzed that has been taken from the reactor, and in order to facilitate sampling, each sample vessel preferably has an adjustable volume. More preferably, the volume prior to commencement of sampling is zero and increases during the sampling in accordance with the sample taken. It is also possible here to generate a reduced pressure by increasing the volume of the sample vessel, such that reaction gas flows into the sample vessel owing to the reduced pressure generated. In order to be able to adjust the volume of the sample vessel, it is particularly advantageous when the sample vessel comprises a cylinder with a piston movable therein. If reduced pressure is to be generated for sampling, this can be effected in a simple manner by moving the piston. The movement of the piston creates a space in the cylinder into which the sample can flow. If the reaction mixture that is to be taken as sample is at a pressure above the ambient pressure, the piston is preferably pushed out of the cylinder by the incoming reaction mixture, which increases the volume of the sample vessel. Alternatively, it is also possible to apply a reduced pressure to the piston and hence to move the piston owing to the reduced pressure applied and to generate the space into which the sample can flow. In this case, either hydraulic or pneumatic control of the piston is possible. In the case of pneumatic control, it is possible to utilize any desired gas, preference being given to air. Hydraulic control can be achieved, for example, with any desired liquid, especially hydraulic oil or water.

The cylinder that forms the sample vessel may have a desired cross-sectional shape. For example, it is possible to use a cylinder having a circular footprint or a cylinder having an angular footprint, for example a triangular, quadrangular, pentagonal or hexagonal footprint. Any other shapes are also possible. However, a cylinder with a circular base is particularly preferred. The piston movable within the cylinder as a shape corresponding to the footprint of the cylinder, such that the piston adjoins the inner wall of the cylinder when it moves. It is preferable when the piston is additionally surrounded by a sealing element, for example an O-ring or a sealing cord which is pressed against the inner wall of the cylinder by the piston, in order to prevent reaction mixture taken a sample from escaping through any possible gap between piston and inner wall of the cylinder.

In order to remove possible impurities from the sample vessel, it is advantageous to purge the sample vessel prior to use with a purging agent which is inert to the reaction mixture to the accommodated. For this purpose, for example, it is possible to use gases such as nitrogen or noble gases. The inert purging agent is preferably supplied to the sample vessel via a purge conduit, wherein the purge conduit is either connected directly to the sample vessel or opens into the feed into the sample vessel. When the sample conduit opens into the feed into the sample vessel, preference is given to using a valve into which the feed and the purge conduit open and from which the feed into the sample vessel commences. Preference is given here to using a controllable valve, such that the purging of the sample vessel can also be automated. If the reaction mixture taking a sample is to be diluted with an inert medium, it is advantageous when the same inert medium is used for purging.

In order to be able to mix the sample taken with an inert medium, the sample vessels are preferably connected to a source for an inert medium. For this purpose, for example, an inert conduit may open into the sample vessel, or a feed into the sample vessel. The source for the inert medium is, for example, a reservoir vessel comprising the inert medium. In the case of a liquid as inert medium, it is possible, for example, to use a liquid tank or any other liquid vessel as source for the inert medium. When the inert medium is a gas, the source of the inert medium is, for example, a suitable gas reservoir, for example a pressure vessel comprising the gas. When the inert medium is used not just to dilute the reaction mixture but also for purging, it is advantageous to supply the inert medium for purging via the same conduit here which it is also supplied for dilution of the reaction mixture. In this case, it is thus unnecessary to provide separate inert conduits and purge conduits.

In order to take an unambiguously defined amount of sample with each sample vessel, it is preferable when, in the case of use of a cylinder with piston movable therein as sample vessel, at least one position sensor with which the position of the piston can be detected is installed.

Suitable examples for this purpose are sensors with which the respective final positions of the piston, i.e. the position with an empty sample vessel and the position with a full sample vessel after taking of the sample are detected. This can be effected, for example, by optical, inductive, mechanical or ultrasound sensors. Alternatively, it is also possible, for example by using a step motor for the movement of the piston, to detect the exact position and hence the exact sample volume at any time in the sampling. A further advantage of the use of a sample vessel with a movable piston is that no additional gas for displacement is required for taking of the sample. In methods with which the sample is displaced from the sample vessel by a gas in order to transport it to an analysis unit, there is the risk that the gas used for displacement will mix with the reaction mixture and hence lead to distorted results. A further advantage is that, in the case of actuation of the piston by means of a suitable drive, for example a step motor, automated withdrawal of the sample for supply to an analysis unit is also possible. When the piston is controlled hydraulically or pneumatically, this can alternatively be accomplished by generating an elevated pressure on the side of the piston remote from the sample, such that the piston is moved in the direction of the sample and forces it out of the sample vessel. This permits, for example, acceptance of a sample into a sample vessel in a fully automated manner, transportation of the sample to the analysis unit and then purging of the sample vessel before acceptance of a further sample.

In order to be able to take samples from a reactor successively at defined times, the reactor preferably has an outlet connected to a multiway valve, and each outlet of the multiway valve is connected to a sample vessel. The use of a multilayer valve permits taking of samples in immediate succession and introduction of new sample into a new sample vessel. For this purpose, in each case after conclusion of the taking of a sample, for example after a defined sampling period or a defined sample volume, the multiway valve can be switched further and the feed to a further, still-empty sample vessel can be opened. Alternatively, it is also possible, after taking of a sample, first to close all sample vessels and, at a later defined time, to open the feed into a further, still-empty sample vessel and to take a further sample. In this case too, the sampling is preferably ended after a defined sampling period has elapsed or after a defined sample volume has been taken by closing the corresponding sample vessel. It is preferable in all variants to end the sampling after a defined amount of sample has been taken.

The multiway valve may be arranged either between the separation apparatus for the particulate catalyst and the liquid separator or downstream of the liquid separator. When the multiway valve is positioned between the separation apparatus and the liquid separator, a liquid separator is preferably accommodated in each conduit connecting the multiway valve to a sample vessel. However, it is preferable when the multiway valve is positioned downstream of the liquid separator.

The sample volume is preferably detected here via the position of the piston of the sample vessel. Once the piston has reached a defined position corresponding to the sample volume to be taken, the sampling is ended. In the case of sampling by applying a reduced pressure by pulling the piston out of the cylinder, the sampling can be adjusted either by measurement of the pressure in the sample vessel or else by means of a defined sampling period. Depending on the duration of the reaction and the size of the reactors used, it is possible to use sample vessels of different size. For frequent sampling at short intervals, for example in order to examine the progression of the reaction, preference is given to using small sample vessels having a volume in the range from 20 to 1000 ml, preferably in the range from 100 to 500 ml, whereas, in the case of studies of longer reactions in which samples are to be taken continuously over a longer period of time and these are mixed in one sample vessel, or else in the case of larger reactors, sample vessels having a volume of 100 ml to 20 l, preferably 1 to 15 l, are used.

Especially when multiple reactors are operated in parallel and a sample is to be taken at the same reaction time from each reactor for an analysis, it is advantageous when a switchable valve is accommodated between each reactor and the associated sample vessel, with which the feed into the sample vessel can be controlled. For instance, the use of switchable valves, for example, permits simultaneous opening and closing of all valves, such that a sample is taken at the same time from all reactors. This is advisable especially when the same reaction is being conducted in the reactors and all reactors are connected to a common reactant feed, such that the reaction is also started simultaneously in all reactors. Alternatively, a controllable valve also permits taking of samples at defined times after the reaction has started in a reactor. In this case, the intervals at which samples are to be taken are defined, and the starting point for the measurement of the first interval is, for example, the attainment of a defined process parameter or the commencement of supply of reactant to the corresponding reactor.

When the sample volumes to be taken are larger than the sample vessels, it is also possible to connect multiple sample vessels to one reactor. This case, a switchable valve is positioned upstream of each sample vessel. For sampling, a switchable valve is opened upstream of a first sample vessel, such that the sample can flow into the sample vessel. As soon as the sample vessel is filled, the switchable valve is closed and the switchable valve of a further sample vessel is opened. This can be repeated until all sample vessels are filled. In addition, it is also possible in this case to take a sample from an already filled sample vessel at this early stage and to analyze it, while further sample vessels are still being filled. In this case, after the sample has been taken from the sample vessel and the sample vessel has possibly been purged, it is again possible to take a new sample.

When samples are to be taken from multiple reactors at different times, it is also possible to connect the same sample vessels to multiple reactors, for example by using a multiway valve between the reactors and the sample vessels, in which each reactor is connected to an inlet of the multiway valve and the multiway valve has an outlet connected to a conduit from which a connection to each sample vessel commences. The switchable valve is then within each connection to the sample vessels.

As an alternative to the above-described sample vessels with a switchable piston, it is also possible to use sample vessels that have a defined volume and are evacuated prior to the sampling. Here too, a switchable valve is positioned upstream of each sample vessel. Owing to the reduced pressure in the sample vessel, a sample is sucked into the sample vessel when the switchable valve is opened. In order to take the sample, it is possible to displace it by means of an inert gas, or disposable cartridges are used as sample vessels, from which the sample can be taken for analysis, or which can alternatively be inserted into a suitable analysis apparatus.

If the apparatus for analysis of reactions comprises multiple reactors, it is possible to perform the same reaction in all reactors in order in this way to examine fluctuations and differences in the progression of the reaction. Alternatively, the use of multiple reactors also permits variation of individual reaction parameters and hence examination of the influence of individual reaction parameters on the reaction. Possible reaction parameters that can be varied are, for example, temperature, pressure and, in the case of continuous reactions, the flow rates of the reactants used and the ratio of the individual reactants, and in batchwise reactions correspondingly the amount of the individual reactants used. In addition, it is also possible to use different catalysts and hence to examine the efficacy of different catalysts for a reaction.

In order to obtain comparable analysis results for those analyses in which the reaction parameters are varied or different catalysts are used, it is necessary for the samples from each reaction each to be taken at defined times, and for the sample volumes also to be the same. The samples present in the individual sample vessels may be analyzed after sampling, for example in order to ascertain the conversion or else to detect by-products formed during the reaction. For this purpose, the analysis methods known from chemical analysis may be used, for example, chromatographic methods such as gas chromatography or high-performance liquid chromatography, spectrometric methods such as mass spectroscopy, spectroscopic methods such as infrared spectroscopy and UV/VIS, or else combinations of different methods.

The apparatus is also suitable for calibration of analytical devices since it is possible to produce a homogeneous sample from a variable product mixture from a reactor by collection and thermal equilibration in the sample vessel. The sample can be guided through a combination of different analytical methods, which means that it is possible to use one method to calibrate other methods having unknown calibration. For example, it is possible for the same sample to flow through an analytical device with an easily calibrated chromatography method (e.g. gas chromatography) and an analytical device with a spectroscopy method (e.g. IR), in order to obtain calibration for the analytical device having a spectroscopy method, which is subsequently able to monitor the reaction products from a reactor with high time resolution as the chromatographic method. This can especially be used in the field of chemometrics, in which chemical information can be extracted from experimental measurement data by mathematical and statistical methods, and a corresponding model can be generated in advance from samples of known composition.

Especially when the gaseous reaction mixture has a condensation point above the ambient temperature, so that at least some of the reaction mixture condenses on cooling, the sample vessels are preferably heatable. As a result, it is possible to warm up the sample vessels to a temperature above the condensation temperature of the reaction mixture, such that the reaction mixture remains in gaseous form in the sample vessel. This is advantageous especially when the subsequent reactions or analyses are to be performed in the gas phase or when the reaction mixture separates into a gas phase and a liquid phase on cooling, which can lead to incorrect or inaccurate measurement results, especially when the exact composition of the reaction mixture is to be detected. The sample vessels can preferably be heated up to a temperature of up to 100° C., and especially to a temperature of up to 150° C., and heating to higher temperatures is also conceivable in the case analysis of reactions with correspondingly high-boiling components. The sample vessels are preferably electrically heated, and heating with heating a medium, for example a thermal oil or else steam, is also possible in the case of fixed incorporation of the sample vessels. In the case of non-fixed incorporation, for example when the sample vessels are to be removed after sampling in order to transport them to an analysis unit, it is advantageous to provide electrical heating, which can be maintained with a suitable accumulator during transport. Alternatively, insulation of the sample vessel may also be sufficient for the transport, in which case preference is given here, for simpler handling, to electrical heating by connection and disconnection of an electrical power supply.

The pressure in the sample vessel preferably corresponds to the pressure of the reaction. However, it is also possible to established different pressures in the sample vessel and in the reactor, in which case, preferably, a lower pressure is established in the sample vessel, for example ambient pressure, in the case of a reaction under elevated pressure, and a higher pressure in the sample vessel, for example ambient pressure, in the case of a reaction below ambient pressure.

As already set out above, the operation of the reactors in step (b) differs according to the properties to be examined. If the intention is to examine fluctuations in a reaction, all reactions are conducted under the same conditions. If the influence of different reaction conditions, for example different amounts of reactant, different temperatures or different pressures or else different catalysts, is to be examined, preference is given to varying the reaction conditions in each reactor. If, in this case, fluctuations in the reactions are also to be examined, it is additionally also possible to operate a particular number of the reactors with the same reaction conditions in each case.

To analyze the progression of the reaction pulsed withdrawal of the samples is effected in step (f), wherein withdrawal is effected at predetermined intervals. It is also possible here, in each case immediately after withdrawal into a sample vessel has ended, to commence withdrawal into a subsequent sample vessel. The withdrawal time is either pre-specified or a sample is in each case taken until a predetermined amount of sample is present in the sample vessel. To this end, the position of the piston in the sample vessel may be detected for example.

In the case of sampling until a particular amount of sample is present in the vessel, it is also advantageous when samples are to be withdrawn in parallel from multiple reactors to commence with sampling into a subsequent sample vessel when the sampling into a sample vessel has ended in all reactors. This ensures that the samples have each been withdrawn at the same time, so that the analysis of the samples taken gives comparable results.

The analysis of the samples in step (g) may be performed with known analytical instruments, for example, as already mentioned above, by chromatographic, spectrometric or spectroscopic methods.

In order to examine the reactions, further reaction parameters are preferably also detected as well as the samples taken, the composition of which can be examined. These further reaction parameters include, for example, the pressure and temperature in the reactor.

Depending on the reactions examined and the analyses to be conducted, it is possible to mix the samples taken with an inert medium. The mixing with the inert medium can be effected in the sample vessel. It is alternatively also possible to transfer the sample from the sample vessel to a further vessel and to mix in the inert medium in the further vessel.

Especially in the case of examination of reactions that are performed continuously, it may also be desirable to detect values averaged over the course of the reaction. For this purpose, for example, the samples taken successively from a reactor can be introduced into a further vessel and mixed in that vessel. Using these mixed samples that had been taken successively, it is then possible, for example, to ascertain an average composition of the reaction mixture. The transferal of the reaction mixture withdrawn as a sample into the further vessel then preferably precedes the analysis in step (g). When the same reaction is performed in multiple reactors and averaged values established at defined times are to be detected, it is alternatively also possible to transfer the samples that have been each taken from the individual reactors at the same time and to mix them therein prior to the analysis.

The apparatus of the invention thus makes it possible to perform serial studies and to detect comparable data for each of the reactions conducted or else to precisely analyze a reaction progression.

To determine the carbon proportion in reactions where carbon may be deposited on the catalyst, for example catalytic cracking reactions, it is preferable when the separation apparatus for separating the particulate catalyst has an oxidizing gas supply, thus making it possible to determine the carbon on the catalyst by combustion. In this case it is further preferable to provide an analysis unit in the outlet conduit from the separation apparatus, said analysis unit preferably being connected to the outlet conduit via a valve.

A reactor comprising an oxidation catalyst can also be accommodated in the connection from the valve to the analysis unit. The gas released in the combustion is first fully oxidized by means of the oxidation catalyst and then supplied to the analysis unit. The analysis unit may, for example, be an IR measurement cell or a mass spectrometer. Analysis units used may be any analytical measurement devices known to the person skilled in the art for analysis of the products present in the particular case.

It is alternatively also possible to dispense with the additional analysis unit and the reactor comprising oxidation catalyst if the carbon dioxide content and carbon monoxide content in the gaseous reaction product are also determinable with the analysis means connected to the sample vessel.

In a preferred embodiment, the apparatus of the invention has been provided with a control system that enables automatic operation of at least parts of the apparatus. It is further preferable that the entire apparatus can be operated fully automatically.

The separation apparatus for the particulate catalyst is preferably connected to a collection container. After termination of the reaction and optionally after removal of the carbon deposited on the catalyst the catalyst accommodated in the separating apparatus may be transferred from the separation apparatus into the collection container via a connecting conduit. The connecting conduit is preferably provided with a valve which is opened before emptying of the separation apparatus. The transferal of the catalyst is effected either by establishing an appropriate carrier stream, which is strong enough to transfer the catalyst from the separation apparatus into the collection container or by repeatedly pressurizing the entire apparatus and forcing the catalyst into the collection container in each case after opening the valve between the separation apparatus and the collection container.

The pressure controller in the outlet conduit for discharging the gaseous reaction product preferably has control dynamics in the range from 1:100, preferably in the range from 1:1000, more preferably in the range from 1:10 000. The control dynamics result from the ratio of the smallest and largest guide value of the valve.

In particular, the pressure controller in the outlet conduit for discharging the gaseous reaction product has a control quality having a deviation relative to the target value of <10%, preferably <5% and more preferably <1%, and/or the settling time of the controller is in the range from 0.1 to 30 seconds, preferably less than 10 seconds, more preferably less than 5 seconds and in particular less than 2 seconds.

It is further preferable when the pressure controller in the outlet conduit for discharging the gaseous reaction product and the pressure measurement sensor connected thereto and a controller form a pressure control loop which is selected from the group of analog or digital backpressure controllers. It is preferably an element from the group of actively controlled backpressure controllers having proportional (p), integral (i), proportional-integral (pi), proportional-differential (pd), integral-differential (id) or proportional-integral-differential (pid) time characteristics. The naming of the time characteristics is nonexclusive with regard to the control methods. The control system may be configured either as a main flow control system or as a secondary flow control system. The control system is preferably configured as main flow control system.

The metering unit for the supply of liquid reactant preferably comprises a twin-needle injector and/or a high-pressure pump. It is preferable to employ a twin-needle injector such as is described in detail in WO-A 2016/166153 A1. Such a twin-needle injector according to WO 2016/166153 A1 makes it possible to introduce liquids into the trickle bed reactor in the form of very small droplets or a liquid mist having very small droplets. The twin-needle injector according to WO-A 2016/166153 is an apparatus for spraying liquids which comprises a needle injector, a liquid feed and a gas feed, wherein the needle injector comprises at least one capillary conduit and at least one outer tube and the needle injector has an internal diameter of each capillary conduit in the range from 2 bis 400 µm. The internal diameter of each capillary conduit is in the range from 4 to 300 µm, more preferably in the range from 5 to 250 µm, and the capillary conduit is arranged coaxially in the interior of the respective outer tube and functionally connected to the gas feed and the outer tube is functionally connected to the liquid feed. The tip of the apparatus is preferably configured such that the capillary conduit and the outer tube have a length differential in the range from 0 to 10 mm, preferably in the range from 2 to 7 mm, wherein it is preferably when the capillary conduit is longer than the outer conduit. It is further preferable when the the twin-needle injector is heated by means of a heating apparatus. The metering unit for supply of liquid reaction medium, which is provided with at least one twin-needle injector, allows very well-controlled supply of liquid into the apparatus. The carrier gas that introduces the flow energy required for atomization into the system is guided by the capillary conduit, and the liquid by the outer conduit. At the tip of the twin-needle injector, gas and liquid are contacted and a very finely divided liquid mist is generated. The liquid volume flow rate may be controlled very exactly and is preferably in a range from 0.1 to 20 ml/min. The gas volume flow rate is preferably in the range from 10 to 300 ml (STP)/min. The temperature of the gas feed is preferably in the range from 20° C. to 300° C., more preferably in the range from 80° C. to 250° C. The temperature of the liquid feed is preferably in the range from 50° C. to 300° C., more preferably in the range from 100° C. to 250° C. The temperature of the housing is preferably in the range from 80° C. to 700° C., more preferably in the range from 100° C. to 650° C., yet more preferably in the range from 150° C. to 550° C. The metering unit for the supply of liquid reactant, which is provided with the twin-needle injector, makes it possible to undertake continuous metering or pulsed metering. The pulses are preferably in the range from 1 to 300 seconds. The twin-needle injector is preferably in a vertical arrangement. This means that the axis of the needle tube is preferably aligned parallel to the longitudinal axis of the reactor. When metering liquids in the presence of gases by means of the twin-needle injector the ratio of gas volume flow rate to liquid volume flow rate is preferably in the range 10 to 200, more preferably in the range 12 to 100.

The pressure change at the outlet side of the reactor during the process is preferably less than 200 mbarg, more preferably less than 100 mbarg and in particular less than 50 mbarg.

The heterogeneously catalyzed reaction is preferably a catalytic cracking reaction and the particulate catalyst is thus in particular an FCC catalyst.

When the reaction is performed at elevated pressure the catalyst reservoir container is preferably pressurized with a defined controlled positive pressure. By means of differential pressure measurement/differential pressure control, which is undertaken in the connecting conduit between the catalyst reservoir container and the separation apparatus, a defined positive pressure relative to the reactor is established in the interior of the catalyst reservoir container. The positive pressure transfers catalyst from the catalyst reservoir container into the inlet region of the reactor. The connecting conduit from the catalyst reservoir container to the reactor may comprise a fluidization gas feed. Downstream of the fluidization gas feed the particulate catalyst and the supplied fluidization gas preferably pass through a short mixing zone which is arranged upstream of the reactor or in the inlet region of the reactor. The reaction generally commences at the time when the reactant fluid comes into contact with the catalyst. The apparatus and the process are preferably used for conversion of oil or vacuum gas oil. The main reaction is the catalytic cracking of the hydrocarbonaceous components into smaller molecules. The occurrence of thermal cracking reactions in addition to catalytic cracking reactions is not ruled out.

The residence time of the catalyst in the reactor is preferably relatively short and is in the range from 0.1 to 10 seconds. The residence time depends in particular on the length of the reactor and the process parameters. The apparatus according to the invention and the process according to the invention are therefore used in particular to analyze reactions that proceed rapidly and are accompanied by rapid deactivation of the catalyst and where a steady state is established in a time range of as little as a few milliseconds to one or two seconds. The period for performing the process is preferably in a range from 10 to 500 seconds, more preferably in a range from 15 to 300 seconds and in particular in a range from 30 to 300 seconds. A representative amount of product components that are characteristic of a given set of process parameters 1 can be collected within the period in question. At the end of a predetermined period the supply of the catalyst and the supply of the reactant components into the reactor are terminated.

After termination of the supply of catalyst and reactants into the reactor, remaining amounts of catalyst and reactant may be passed through the reactor into the separation apparatus. Once the supply of gaseous reaction product and catalyst into the separation apparatus has concluded the catalyst collected in the separation apparatus is purged with a stripping gas for a further period in order to remove volatile product components that have been adsorbed by the surface of the catalyst. The duration of the treatment of the catalyst in the separation apparatus after catalyst supply has concluded is in the range from 0 to 600 seconds, preferably in the range from 30 to 300 seconds.

All products formed in the reaction are preferably subjected to a qualitative and quantitative determination, wherein the amount of unconverted reactant is also determined. In the conversion of oils, the amount of carbon on the catalyst is determined, and the amounts of gaseous and liquid components and their composition. Using the analysis results, conversions and selectivities are determined for the individual product components and these are expressed in relation to the set of experimental method parameters chosen in each case for the cracking.

It is naturally also conceivable to perform the process such that that a plurality of different process parameters are successively adjusted during performance of the process. If the amount of liquid product is determined by weighing, the liquid separator must be deinstalled. There are in principle possibilities for further improving the process through reconfiguration and automation, such that, for example, continuous monitoring of conversion is made possible.

A further advantage of the apparatus according to the invention is that the process according to the invention offers a high flexibility with regard to the positive pressure at which the process is performed. The method of the invention can be performed at any pressure for which the pressure-rated components have been designed. In a preferred embodiment, the process is performed at a pressure in the range from 0.1 to 10 barg, preferably in the range from 0.3 to 5 barg. In one aspect of the process according to the invention, the process may be performed in the high-pressure range, the high-pressure range being defined by a pressure in the range from 1.5 to 10 barg, preferably a pressure in the range from 2 to 8 barg. It is of central importance for the invention in this connection that it enables pressure control via the valve of the pressure controller (7) in order that a further adjustment range can be realized at this position in the outlet conduit. Further preferably, the valve of the pressure controller in the control system has settling times where the pressure control circuit settles out within a period of less than 100 ms, preferably a period of less than 70 ms and further preferably within a period of less than 50 ms. The rapid settling times of the pressure control zone are of importance especially in the case of cracking reactions since the cracking reactions are associated with a great increase in volume. In the case of cracking reactions, depending on the respective cracking activity, it is possible that the volume flow rate increases by five times compared to the volume flow rate of the liquid reactant supplied in the carrier gas.

The separation apparatus preferably has a volume in the range from 0.1 to 2 liters, more preferably in the range from 0.2 to 1 liters.

The total pressure during performance of the process may be kept constant either by managing the flow of the supplied inert gases or by managing the outflowing gases according to the inflowing flow and the gases additionally formed by the reaction.

The management of the incoming inert gas flows results in a change in the partial pressures since the streams are altered. If large amounts of gaseous products are formed, the amount of inert gas can be greatly reduced. As a result, the conversion, yields and selectivities would change during the reaction. In addition, the catalyst flow into the reactor is altered since the inert gas flows additionally have the function of maintaining the pressure drop between catalyst reservoir and reactor and hence are responsible for the continuous and constant metering of the catalyst. If the incoming inert gas flows were controlled in accordance with the changes in the system pressure, continuous and constant metering would no longer be possible. Thus, management of the incoming inert gas flows is a less preferred embodiment.

Preference is given to managing the outflowing gases according to the inflowing flow and the gases additionally formed by the reaction. The pressure control circuit is implemented individually from the components pressure sensor as the actual value sensor, controller and actuator. A suitable actual value sensor is any pressure sensor directly functionally connected to the reactor, the separation apparatus or the connecting conduits of these components. The pressure controller is preferably a controller from the group of pneumatic controllers, electrical controllers and digital controllers. Further preferably, a pressure controller configured as a relief valve, more preferably as a membrane relief valve, is used in the exit conduit. The relief valve forms a control circuit, where the actuator element is simultaneously the actual value sensor. In the case of the membrane relief valve, the target value is transmitted by loading the membrane with a gas pressure from the side remote from the reaction space.

In a preferred embodiment, the process according to the invention has the characteristic feature that the actual value for the pressure controller is obtained by combining the signal from at least two different pressure sensors, wherein the signals are combined. A preferred method of combining the signals from the pressure sensors is formation of an average; preference is additionally given to formation of a weighted average.

In order also to be able to analyze the catalyst passed through the reactor it is further preferable for the separation apparatus to be connected to a catalyst withdrawal apparatus with which catalyst samples may be withdrawn from the separation apparatus The catalyst samples may then be transferred into the sample jars. The catalyst collected in the sample vessels may then be analyzed with suitable analytical methods, for example in respect of its composition. In order that different samples may be transferred into different sample vessels or that samples may be taken at different times it is preferable when the catalyst can be transferred from the catalyst withdrawal apparatus into different sample vessels. To this end it is particularly preferable to arrange the sample vessels on a transport apparatus, so that in each case a sample vessel can be positioned at the catalyst withdrawal apparatus such that it may be filled with catalyst and as soon as a catalyst sample has been filled into a sample vessel a new sample vessel can be positioned at the catalyst withdrawal apparatus. It is particularly preferable when the transport apparatus is a carousel on which the sample containers are arranged, which rotates onwards after a sample container has been filled, so that the next sample container on the carousel is moved to the catalyst withdrawal apparatus.

In a particularly preferred embodiment, the reactor is a tubular reactor through which the particulate catalyst can flow from top to bottom and the separation apparatus is connected to a catalyst withdrawal apparatus, by means of which catalyst can be transferred into sample vessels arranged on the transport apparatus, in particular the carousel. The separation apparatus is further connected to a distributor channel to which a plurality of liquid separators are connected, wherein in each case one liquid separator is connected to one sample vessel for accommodating gaseous reaction product and/or wherein a plurality of liquid separators are connected to a plurality of sample vessels for accommodating the gaseous reaction product via a distributor channel. It is particularly preferable when all liquid separators are connected to a plurality of sample vessels for accommodating the gaseous reaction product via a common distributor channel.

Illustrative embodiments of the invention are shown in the figures and are elucidated in detail in the following description.

Figure 2:
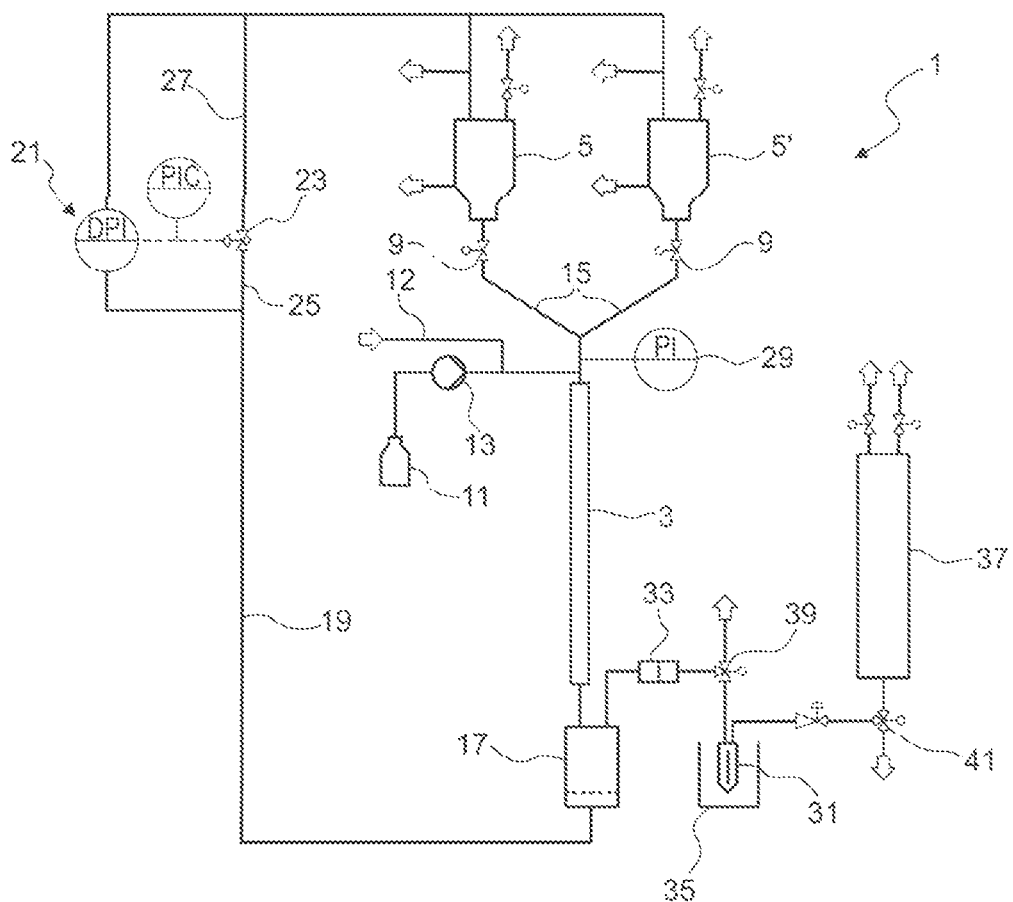
Figure 3:
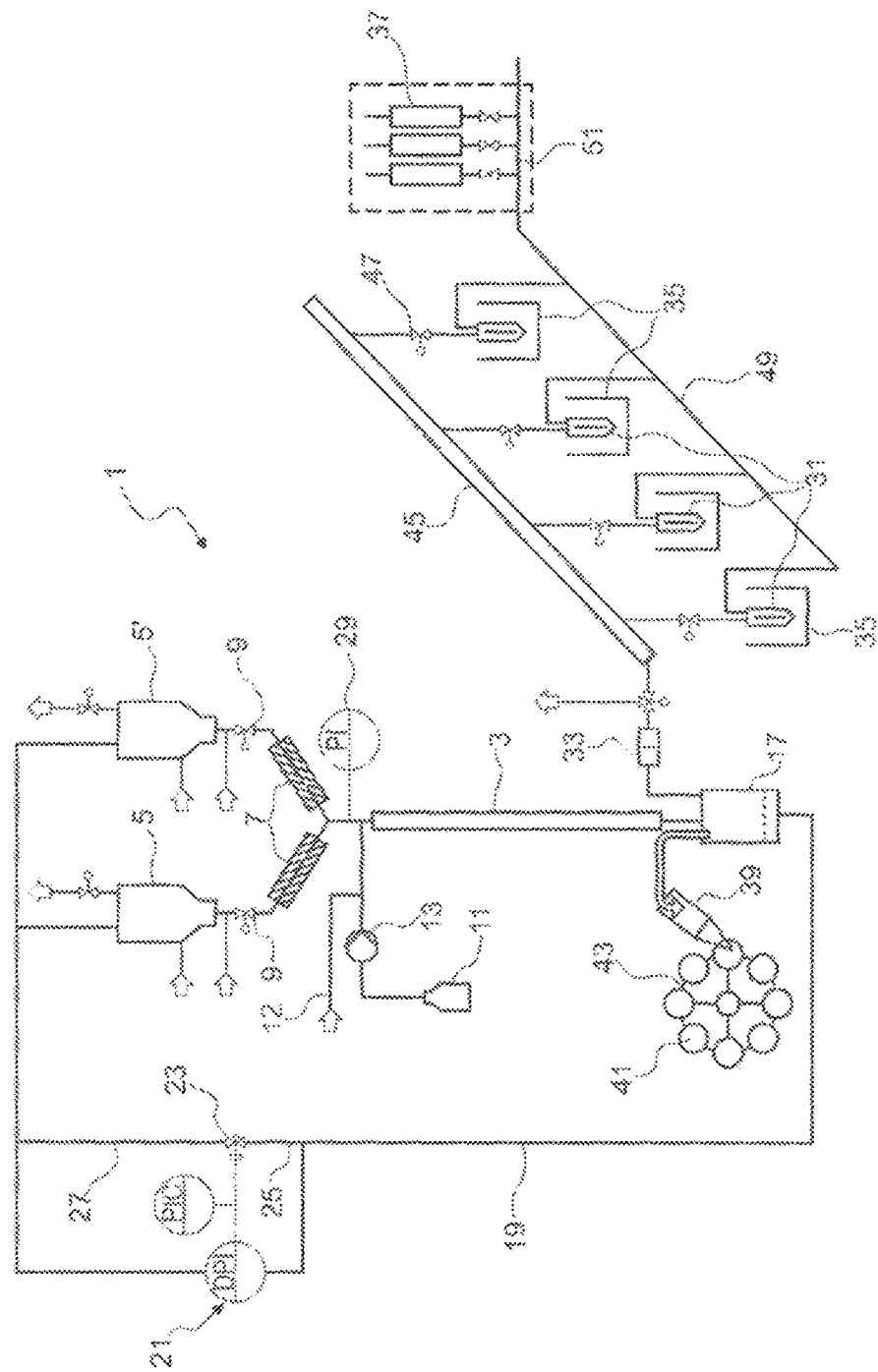
Figure 4:
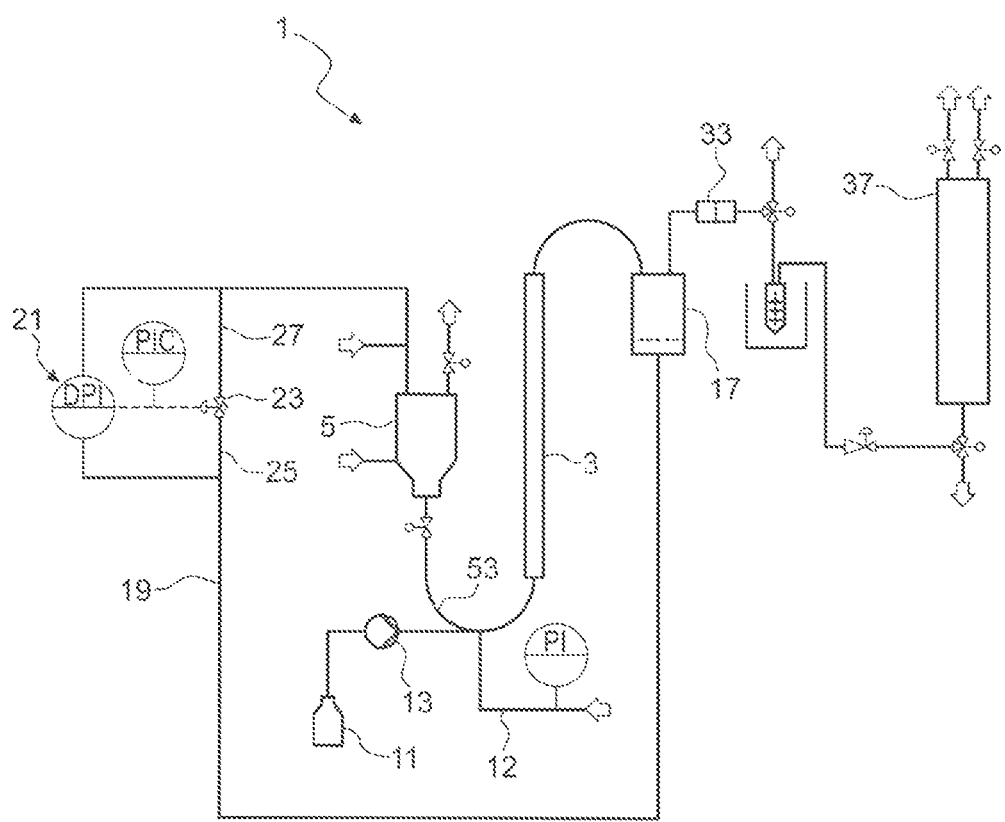
Figure 5:
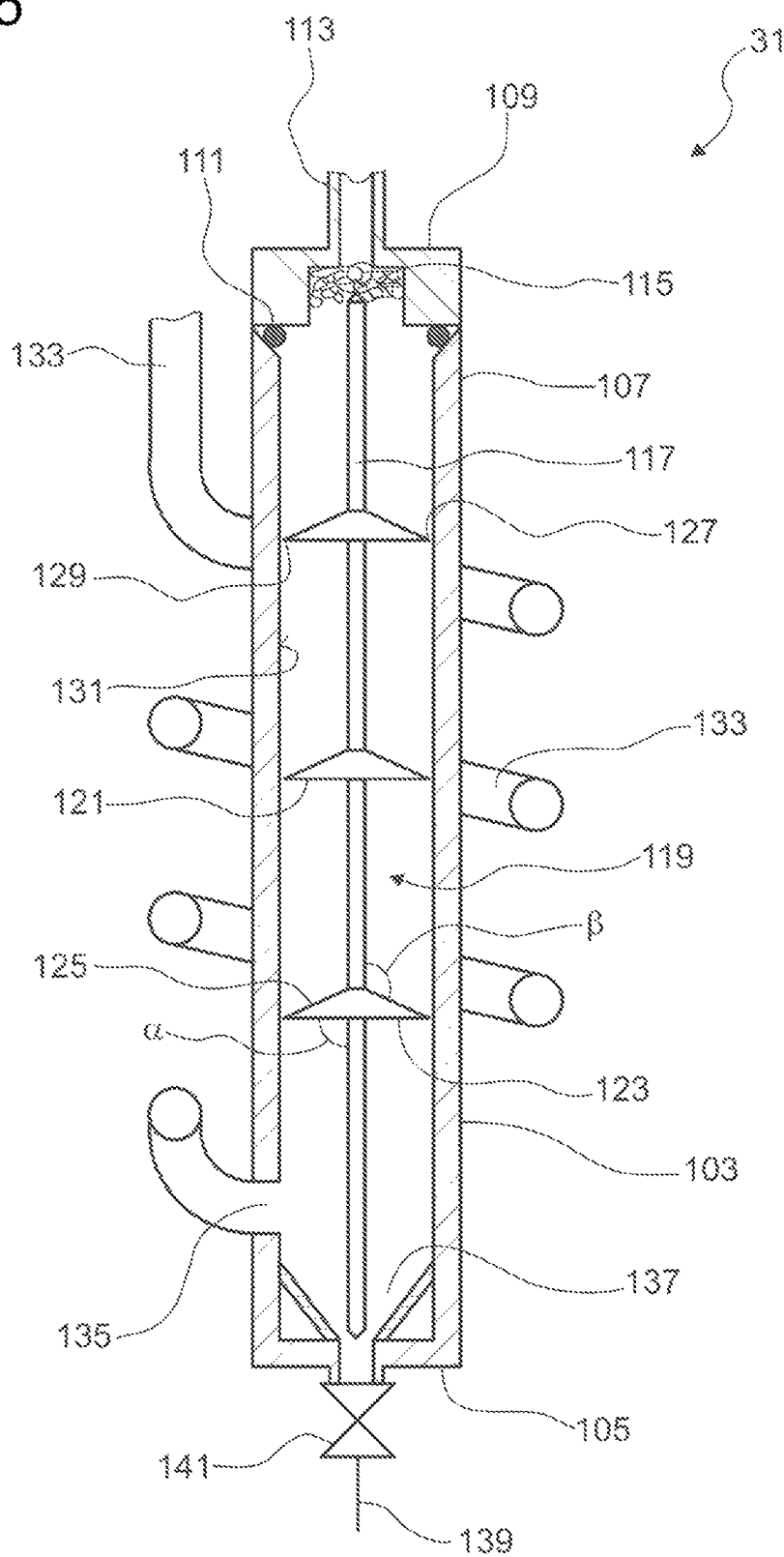
Figure 6:
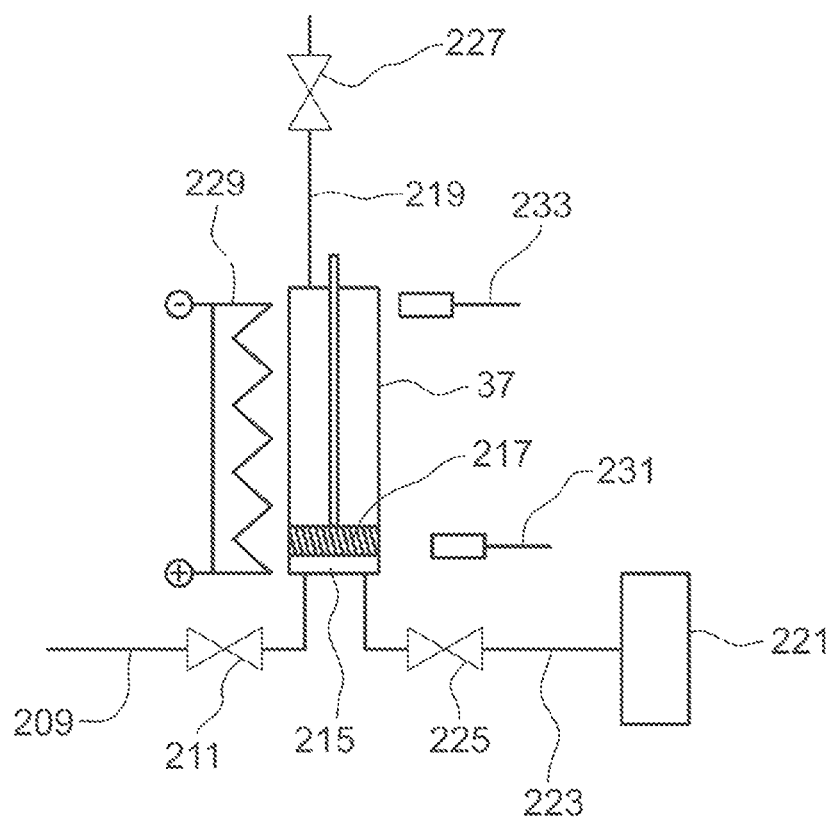
Figure 7:
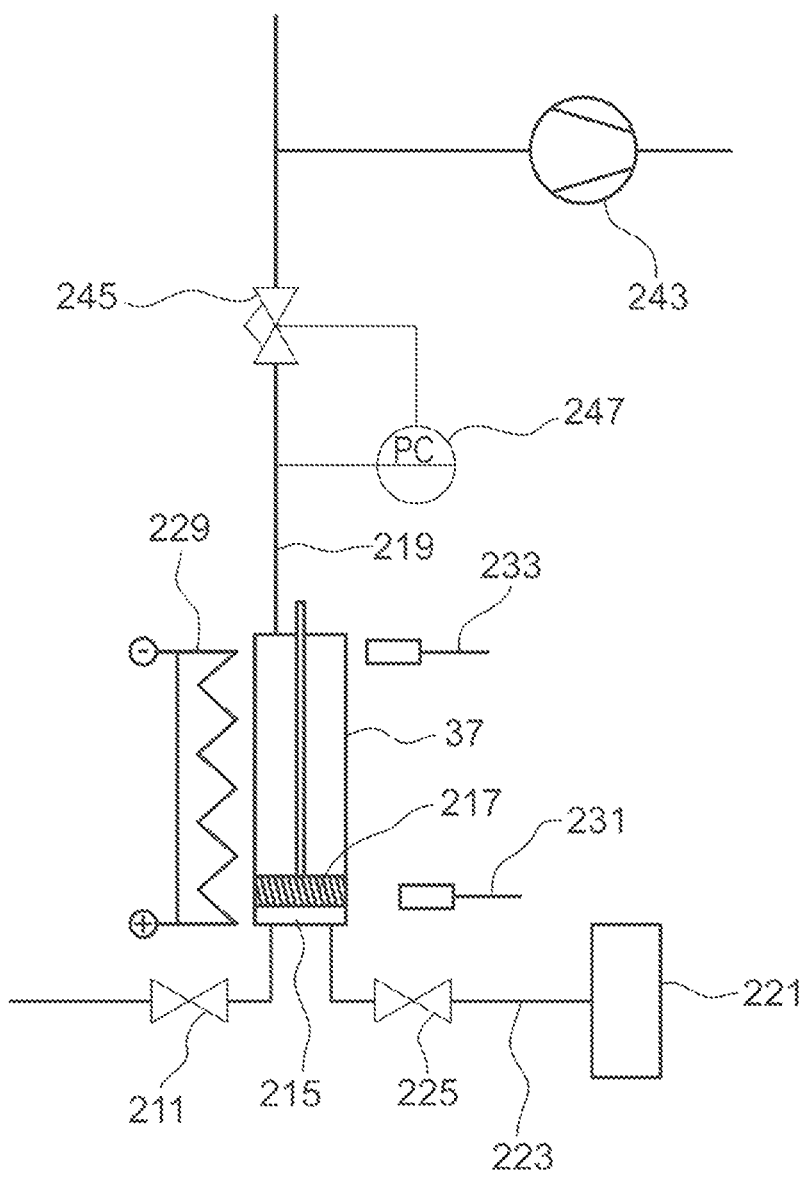
Figure 8:
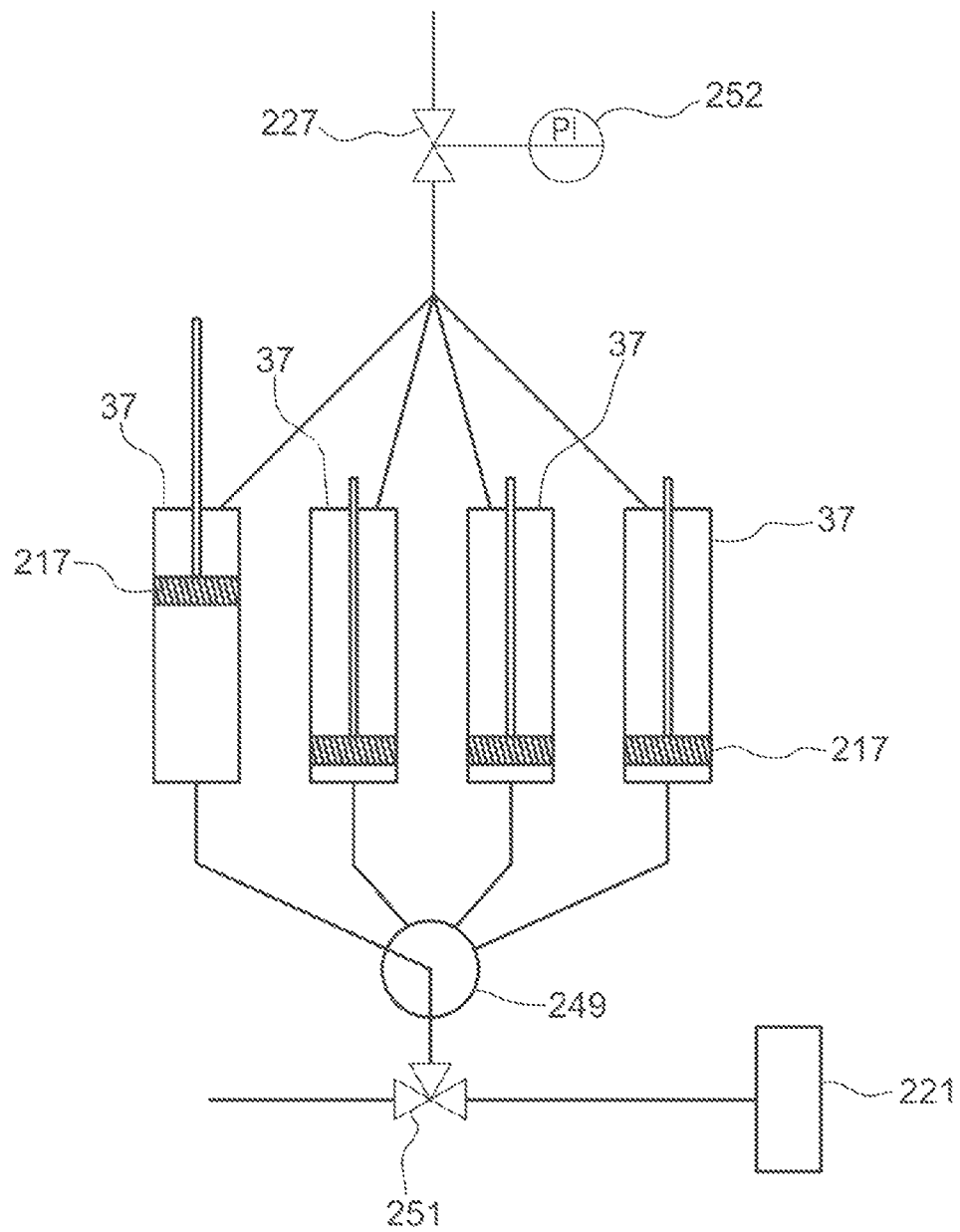
Figure 9:
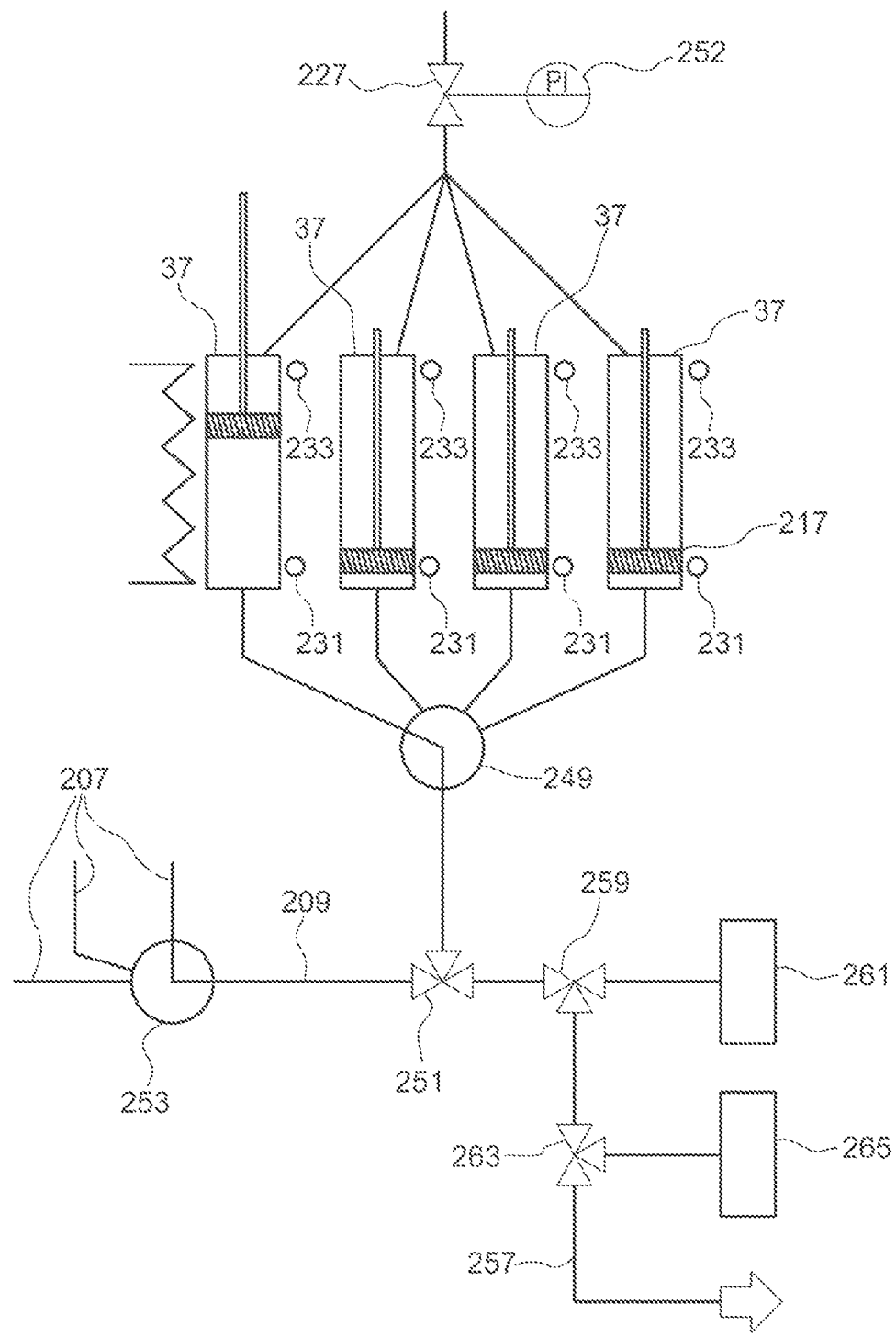
Figure 10:
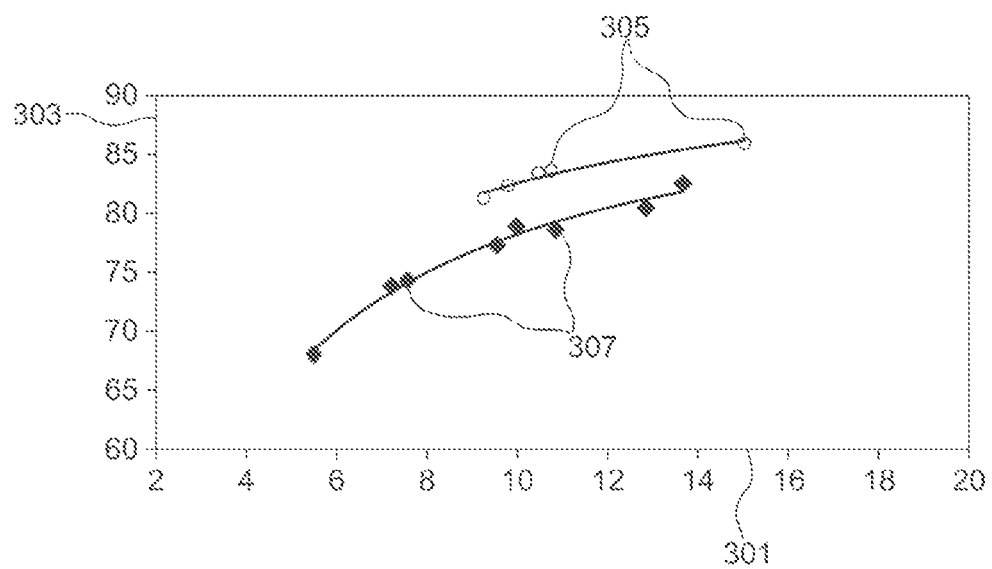
Figure 11:
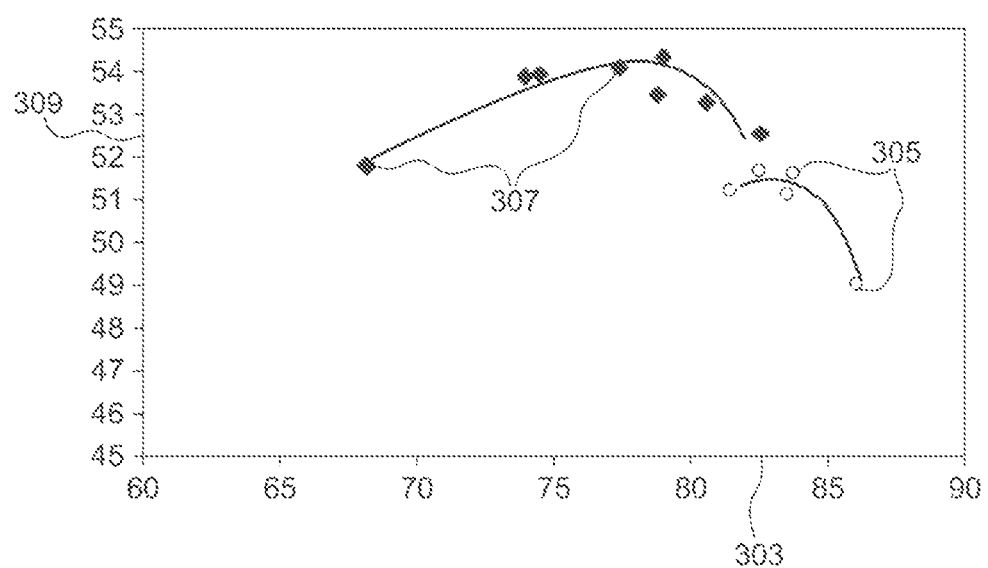
Figure 12:
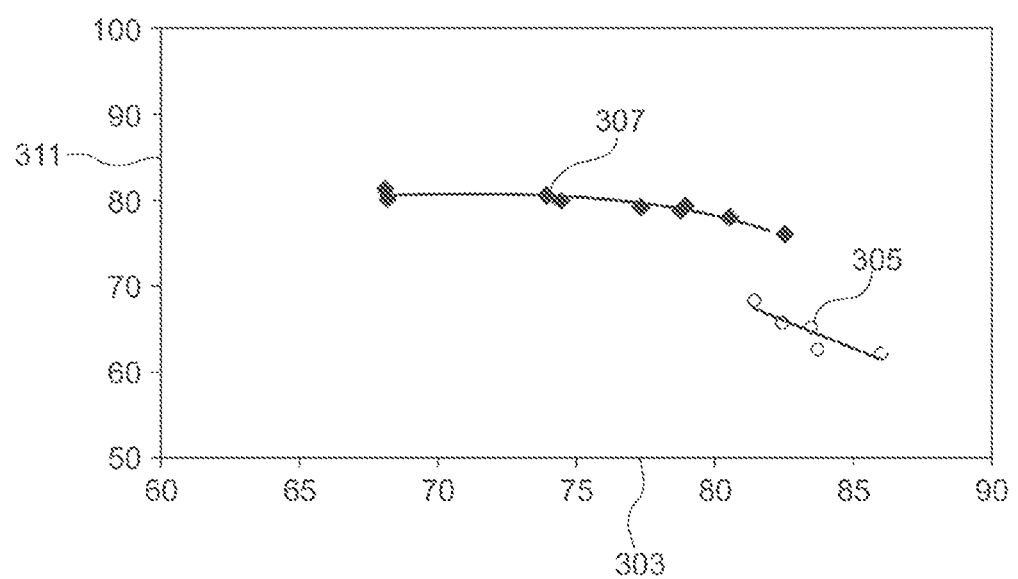

In the figures:

FIG. 1 shows an apparatus according to the invention comprising a reactor traversed from top to bottom having a preheating zone for the catalyst, FIG. 2 shows an apparatus according to the invention comprising a reactor traversed from top to bottom having two catalyst reservoir containers, FIG. 3 shows an apparatus according to the invention comprising a reactor traversed from top to bottom having a plurality of sampling points, FIG. 4 shows an apparatus according to the invention comprising a reactor traversed from bottom to top, FIG. 5 shows a liquid separator, FIG. 6 shows a sample vessel having an analysis unit in a first embodiment, FIG. 7 shows a sample vessel with pressure control, FIG. 8 shows an evaluation unit having a plurality of sample vessels, FIG. 9 shows an evaluation unit having a plurality of sample vessels and a plurality of analysis units, FIG. 10 shows the conversion of heavy oil as a function of the ratio of catalyst to reactant, FIG. 11 shows the yield of gasoline as a function of conversion, FIG. 12 shows the yield of propene as a function of conversion.

FIG. 1 shows an apparatus for analyzing heterogeneously catalyzed reactions comprising a reactor traversed from top to bottom and a preheating zone for the catalyst, An apparatus 1 for analyzing heterogeneously catalyzed reactions comprises a reactor 3 through which a particulate catalyst flows. To this end the reactor 3 is preferably a tubular reactor aligned at an angle of 45° to 90° to the horizontal and particularly preferably at an angle of 90° to the horizontal as shown here. The reactor 3 is connected at its upper end to a catalyst reservoir container 5.

In order to be to perform endothermic reactions, for example catalytic cracking reactions, the particulate catalyst present in the catalyst reservoir container 5 is heated before it flows into the reactor 3. To this end, it is preferable to heat the catalyst in the catalyst reservoir container 5 to a temperature at which the catalyst is not damaged. If this temperature is below the temperature at which the catalyst is intended to flow into the reactor, a preheating zone 7 in which the catalyst is further heated while flowing therethrough is additionally provided between the catalyst reservoir container 5 and the reactor 3. This preferably brings the catalyst to a temperature high enough to introduce the energy required for the endothermic reaction into the reactor. Especially in the case of catalytic cracking reactions the catalyst is to this end heated to a temperature in the range from 500° C. to 800° C. in the catalyst reservoir container 5 and further heated to a temperature in the range from 1000° C. to 1200° C. in the subsequent preheating zone 7.

To control the supply of the catalyst into the reactor 3 a first valve 9 is preferably arranged between the preheating zone 7 and the catalyst reservoir container 5. The first valve 9 is opened prior to commencement of an analysis, so that the catalyst can flow through the preheating zone 7 into the reactor 3. As soon as an experiment is terminated the first valve 9 is closed again. No further catalyst can flow into the reactor 3 and the reaction is thus also concluded.

In order to allow a reaction to be performed it is further necessary to supply the reactants necessary for the reaction. This is preferably achieved by supplying liquid reactant from a reactor reservoir container 11 to the reactor 3 via a suitable conveying means, for example a pump 13. The reactant may either be supplied directly at the upper end of the reactor 3 or, as shown in FIG. 1, via a connecting conduit 15 through which the particulate catalyst flows from the preheating zone 7 into the reactor 3. Alternatively or in addition to the liquid reactant from the reactant reservoir container 11 further reactant, in particular gaseous reactant or an inert gas, may also be supplied via a feed 12. The feed 12 preferably opens into a feed conduit to the reactor 3 before addition of the particulate catalyst to the reactor 3. The addition of an inert gas via the feed 12 is especially advantageous when the liquid reactant is to be brought into contact with the catalyst in finely atomized form. In this case the inert gas is used for atomizing the liquid reactant in a suitable injector.

After flowing through the reactor 3 the catalyst is is passed with a gaseous reaction product optionally comprising liquid and/or condensable components into a separation apparatus 17 for separation of the particulate catalyst.

To adjust the pressure in the reactor 3 the separation apparatus 17 is connected to the catalyst reservoir container 5 via a functional connection 19. Accommodated in the functional connection 19 is a differential pressure controller 21 which actuates a continuously active valve 23, wherein the outlet side of the valve 23 has a connection conduit 25 to the separation apparatus 17 and the inlet side of the valve 23 has a connection conduit 27 to the catalyst reservoir container.

The differential pressure controller 21 makes it possible to establish a defined pressure gradient between the catalyst reservoir container 5 and the reactor 3. The pressure gradient serves as a driving force for transferring the catalyst from the catalyst reservoir container 5 into the reactor 3. In addition, a pressure sensor 29 which captures the pressure at the inlet to the reactor is provided at the inlet to the reactor 3. The desired reaction pressure can be controlled using the pressure at the inlet to the reactor and the pressure gradient controlled via the differential pressure controller 21.

After separation of the particulate catalyst in the separation apparatus 17 the gaseous reaction product possibly still comprising liquid and/or condensable components is supplied to a liquid separator 31. In order to separate any catalyst particles still present in the gaseous reaction product the gaseous reaction product is preferably passed through a filter 33 upstream of the liquid separator 31.

In order also to separate condensable components in the liquid separator 31 said separator is preferably cooled. To this end the liquid separator may be accommodated in a cooling bath 35 for example. The cooling causes the condensable components to condense out of the gaseous reaction product and be separated in the liquid separator. After separation of the liquid and/or condensable components in the liquid separator 31 the gaseous reaction product is supplied to a sample vessel 37. If only a portion of the gaseous reaction product is to be analyzed it is also possible to withdraw the gaseous reaction product from the process before entry into the liquid separator via a first 3-way valve 39 or before entry into the sample vessel via a second 3-way valve 41. However, it is preferable to also connect a respective analysis unit to the first 3-way valve 39 or the second 3-way valve which makes it possible to determine properties, in particular the composition, of the gaseous reaction product.

FIG. 2 shows an apparatus according to the invention for analyzing heterogeneous catalyst reactions in a second embodiment.

In contrast to the embodiment shown in FIG. 1, the embodiment shown in FIG. 2 further comprises two catalyst reservoir containers 5, 5'. The use of the first catalyst reservoir container 5 and the second catalyst reservoir container 5' makes it possible to perform the reaction over a longer period or with a larger amount of catalyst. In particular this makes it possible during withdrawal of particulate catalyst from one catalyst reservoir container 5, 5' to fill the other catalyst reservoir container 5', 5 with fresh catalyst and optionally preheat said container. Once a minimum fill level has been achieved in the first catalyst reservoir container 5, 5 it is then possible to switch over to the second catalyst reservoir container 5', 5, so that catalyst can continue to flow into the reactor 3 continuously.

As well as the use of two catalyst reservoir containers 5, 5', as shown here, it is also possible to employ more than two, for example three, four or more catalyst reservoir containers 5, 5'. The use of a plurality of catalyst reservoir containers 5, 5' especially has the advantage that the individual containers may be made smaller, thus also allowing more rapid heating of the catalyst present therein.

If the catalyst in the catalyst reservoir container 5, 5' can be sufficiently temperature controlled, in particular heated, as shown in FIG. 2, the additional preheating zone 7 may be dispensed with. However, it is also possible, as in the embodiment shown in FIG. 1, to provide each of the connecting conduits 15 from the catalyst reservoir container 5, 5' with a preheating zone 7 to be able to further preheat the catalyst before entry into the reactor 3.

FIG. 3 shows an apparatus for analyzing heterogeneously catalyzed reactions which comprises a plurality of liquid separators and sampling points.

The supply of reactants, in particular catalyst, into the reactor 3, and the differential pressure control is in the embodiment shown in FIG. 3 carried out according to that shown in FIG. 2, wherein the connecting conduit here in each case accommodates a preheating zone 7 to further heat the catalyst before entry into the reactor 3.

In order to allow analysis of not only the gaseous reaction product the separation apparatus 17 for the particulate catalyst comprises a catalyst withdrawal apparatus 39. Said apparatus allows particulate catalyst to be withdrawn from the separation apparatus 17 and filled into sample vessels 41. In the embodiment shown the sample vessels 41 are arranged in a carousel 43 which can rotate onwards after the filling of a sample vessel 39, so that an empty sample vessel 41 can be passed to a catalyst withdrawal apparatus 39 and then filled with catalyst withdrawn from the separation apparatus 17.

The filled sample vessels 41 may then be withdrawn from the carousel 43 and the catalyst present therein may be analyzed. To this end the filled sample vessels 41 may either be manually withdrawn or the sample vessels 41 are automatically withdrawn and passed to corresponding analysis units which allow analysis for example of the composition of the catalyst or else deposits on the catalysts.

The gaseous reaction product optionally comprising liquid and/or condensable components is passed into a distributor channel 45, to which a plurality of liquid separators 31 are each connected via a valve 47. This allows for example performance of a plurality of consecutive reactions, wherein each reaction actuates a new liquid separator 31. The respective liquid separator 31 may be removed for example after conclusion of a reaction to allow determination of a liquid amount in the liquid separator. The liquid and/or condensable components may then be separated simultaneously during a further reaction in a further liquid separator 31. However, it is preferable to initially perform a plurality of reactions, where in each case a different liquid separator 31 is employed, and after conclusion of all reactions to analyze the liquid separated in each case.

The outlets of the liquid separator 31, through which the gaseous reaction product is withdrawn after separation of the liquid, open into a collector 49. A further distributor channel 51 or a multiway valve, by means of which a plurality of sample vessels 37 may be filled, is connected to the collector 49. The connection of a plurality of sample vessels 37 makes it possible for example to take a plurality of samples during a reaction in order to allow analysis of the progression of the reaction and reaction kinetics for example. However, it is further also possible according to the above-described use of the liquid separator 31 to perform a plurality of reactions consecutively and supply the gaseous reaction product of each reaction to a sample vessel 37. Once all reactions have concluded the gaseous reaction product of each reaction may be analyzed. It is alternatively also possible already to commence analysis of the gaseous reaction product from one sample vessel 37 while a further reaction whose gaseous reaction product is accommodated in a further sample vessel 37 proceeds.

It is particularly preferable when, as shown in FIG. 3, the reactor 3 is traversed from top to bottom and the separation apparatus 17 follows the reactor 3 in the flow direction. The separation apparatus is connected to a catalyst withdrawal apparatus 39 which is connected to a plurality of sample vessels 41, wherein the sample vessel 41 are preferably arranged on a carousel 43, so that the catalyst from the separation apparatus 17 can be transferred into the sample vessels 41, preferably into more than two sample vessels 41, in particular four or more sample vessel 41, using the catalyst withdrawal apparatus 39. The separation apparatus 17 is further also connected via a distributor channel 45, also known as a manifold, to a plurality of liquid separators 31, wherein the liquid separators 31 are particularly preferably utilized as collection vessels for the liquid. The distributor channel 45 is preferably connected to two or more liquid separators 31 and in particular to four more liquid separators 31. It is further particularly preferable when the liquid separators are functionally connected to a plurality of sample vessels 37, preferably two or more sample vessels 37 and in particular four or more sample vessels 37, wherein gaseous reaction product is collected in the sample vessels 37.

FIG. 4 shows an apparatus according to the invention for analyzing heterogeneously catalyzed reactions comprising a reactor traversed from bottom to top.

The reactor 3 shown in FIG. 4 differs from that of FIG. 1 by the flow direction of the particular catalyst. In order to achieve a uniform catalyst flow in the reactor 3 the catalyst reservoir container 5 is connected to the reactor 3 via a pipe arc 53 having a radius in the range from 25 to 75 mm. The addition of the reactant from the reactant reservoir container 11 or via the feed 12 may, as shown here, be effected in the pipe arc 53. It is alternatively also possible to already supply the reactant upstream of the pipe arc 53 or only shortly before entry into the reactor 3.

A liquid separator, as employed according to the invention in the apparatus 1, is shown in FIG. 5.

The liquid separator 31 comprises a metallic tube 103 having a first end 105 and a second end 107. In the embodiment shown here the metallic tube 103 is closed at its first end 105. The second end 107 is closed with a removable cover 109. The removable cover may secured by any means known to those skilled in the art, for example by screw-closure or the use of a bayonet closure or a clamp or clip. To achieve a gastight connection a sealing element 111 is accommodated between the metallic tube 103 and the removable cover 109. A suitable sealing element 111 is in particular an O-ring.

A gas outlet 113 is formed in the removable cover 109. The gas outlet 113 is provided with a droplet separator 115 on the side pointing into the metallic tube 103. The droplet separator 115 is preferably made of glass wool on which droplets are separated when the gases reaction product flows through the droplet separator 115 into the gas outlet 113.

The droplet separator 115 is held in its position in the cover 109 by an axis 117 of a deflection body 119. The deflection body 119 shown in FIG. 5 comprises three deflection plates 121. Other than three deflection plates 121, as shown here, the deflection body 117 may also have more or fewer deflection plates 121, for example 1 to 20 deflection plates 121, preferably 1 to 10 deflection plates 121 and in particular 3 to 6 deflection plates 121. The side 123 of each deflection plate 121, which points toward the first end 105 of the metallic tube 103, encloses an angle α of 90° with the axis 117 of the deflection body 119.

The side 125 of the deflection plates 121 that points toward the second end 107 of the metallic tube 103 encloses an angle β between 90° and 150° with the axis 117 of the deflection body 119, wherein the angle is preferably greater than 90°.

Each deflection plate 121 is configured such that a gap 127 of 0.05 to 1 mm in width is formed between the edge 129 of every deflection plate 121 and the inner wall 131 of the metallic tube 103.

The liquid separator 31 further comprises a feed conduit 133 through which the reaction product comprising liquid and/or condensable components is supplied to a side feed 135 in the metallic tube 103. The feed conduit 133 wraps helically around the metallic tube 103.

During operation the gaseous reaction product comprising liquid and/or condensable components flows into the feed conduit 133 and flows through the feed conduit 133 to the side feed 135, through which it flows into the inside of the metallic tube. Especially when the gaseous reaction product comprises condensable components the gaseous reaction product in the feed conduit 133 is cooled, so that the condensable components begin to condense and liquid droplets are formed. For cooling it is possible for example to introduce the entire liquid separator 31 into a cooling bath 35.

Once the gaseous reaction product has flowed into the inside of the metallic tube 103 it flows in the direction of the gas outlet 113. To reach the gas outlet 113 the gaseous reaction product must pass the deflection plates 121, wherein the gaseous reaction product flows through the gap 127. This leads to deflection and acceleration of the gas stream. After passing through the gap 127 the gas stream slows down and opens into the entire space above the deflection plate 121. This is repeated at each baffle 121. Due to their mass, the droplets that have formed in the gaseous reaction product are deposited on the side 123 of the deflection plates 121 that points in the direction of the first end 105 of the metallic tube 103. The droplets that are deposited on the deflection plates 121, the axle 117 and the inner wall 131 of the metallic tube agglomerate and flow towards the lower end 137 of the metallic tube 103. The liquid may be withdrawn from the lower end 137 of the metallic tube 103 through a liquid outlet 139.

In order to prevent gas from the liquid separator 31 being withdrawn through the liquid outlet 139 when the separation of the liquid is performed at elevated pressure or a pressure below ambient pressure the liquid outlet 139 may be sealed by a suitable valve 141. The valve 141 allows for example withdrawal of liquid at predetermined times or once a predetermined fill level has been achieved. If liquid is to be withdrawn once a predetermined fill level has been reached it is particularly preferable to employ a fill level sensor with which the fill level may be determined. To this end it is possible to employ either a fill level sensor which continuously measures the fill level in the lower portion 137 of the metallic tube 103 or a sensor which only provides a signal once a fill level at which the sensor comes into contact with liquid has been achieved. To withdraw the liquid from the liquid separator the valve 141 may be operated either manually or in automated fashion. If an automatic valve is employed it is particularly preferable if it closes once a predetermined lower fill level has been reached.

Especially if not all liquid components have been separated by the deflection body 119, remaining droplets are separated by the droplet separator 115 when the gaseous reaction product flows through the droplet separator 115 to the gas outlet 113.

If the liquid remains in the droplet separator 115 and the droplet separator 115 becomes saturated with liquid or the droplet separator 115 blocks the gas outlet 113 due to deposits it is necessary to replace the droplet separator 115. Saturation or clogging of the droplet separator 115 is detectable for example through an increasing pressure drop over the liquid separator or through a reduced gas flow.

To replace the droplet separator 115 the removable cover 109 is removed so that the droplet separator 115 is accessible and can be removed. The droplet separator 115 can then be removed from the cover 109 and cleaned or replaced with a new droplet separator 115.

Besides a removable cover 105 at the second end 107 of the metallic tube it is alternatively or in addition also possible to close the first end 105 of the metallic tube 103 with a removable cover. FIG. 6 shows a sample vessel comprising an analysis unit in a first embodiment.

To allow analysis of the gaseous reaction product this is preferably collected in sample vessel 37. To this end the gaseous reaction product is introduced into the sample vessel 37 via a sample conduit 209 via a first valve 211.

In order to take a sample, the first valve 211 is opened. With the first valve 211 open gaseous reaction product can then flow into a sample chamber 215 in the sample vessel 37 via the sample conduit 209. As shown here, the sample chamber 215 is preferably delimited on one side by a piston 217 movable within the sample vessel 37. The piston 217 can be used to adjust the volume of the sample chamber 215 in the sample vessel 37. At the start of the sampling, the piston 217 is preferably in a first position in which the volume of the sample chamber 215 is at a minimum.

With commencement of sampling, the piston 217 then moved in the direction of a second position in which the volume of the sample chamber 215 is at a maximum. As soon as the piston 217 has reached the second position or if the sampling is to be ended before the sample has reached the second position 217, the valve 211 is closed, so that no further gaseous reaction product can flow into the sample chamber 215 in the sample vessel 217.

The movement of the piston 217 can be assisted for sampling in that a pressure lower than the pressure of the gaseous reaction product is applied to the side of the piston 217 remote from the sample chamber 215. This simultaneously leads to suction of reaction mixture into the sample chamber 215. In order to apply the lower pressure to the side of the piston 217 remote from the sample chamber 215, it is possible, for example, for a gas conduit 219 on the side of the piston 217 remote from the sample chamber 215 to open into the sample vessel 37. In order to apply the lower pressure, the gas conduit 219 sucks gas out of the sample vessel, such that the piston 217 moves in the direction of its second position. As soon as the sampling is to be ended, the suction of the gas is ended.

The gaseous reaction mixture present in the sample chamber 215 is then sent to an analysis unit 221 in a next step. It is possible here to use any desired analysis unit with which the desired analyses on the gas mixture can be conducted. Customary analysis units are especially those with which the composition of the gaseous reaction product can be determined. In order to be able to supply the gaseous reaction product to the analysis unit 221, the analysis unit 221 is connected via a measurement conduit 223 to the sample chamber 215 in the sample vessel 37. In order to be able to close the measurement conduit 223, a second valve 225 is accommodated in the measurement conduit 223. During the sampling, the second valve 225 is closed.

In order to supply the sample to the analysis unit 221, the second valve 225 is opened. Then the piston 217 is moved in the direction of its first position, such that the gaseous reaction product present in the sample chamber 215 is forced out of the sample chamber 215 into the measurement conduit 223 by the movement of the piston 217 and supplied to the analysis unit 221 through the measurement conduit 223. The piston 217 can be moved either with a suitable drive or, as shown here, with the aid of pressurized gas which flows into the sample vessel via the gas conduit 219 and acts on the side of the piston 217 remote from the sample chamber 215. The pressure exerted on the piston 217 by the pressurized gas forces it in the direction of the sample chamber, such that the gaseous reaction product present in the sample chamber is forced into the measurement conduit 223. As soon as the piston 217 has reached its first position at which the volume of the sample chamber is at a minimum, the supply of pressurized gas is ended. For this purpose, a third valve 227 is preferably provided in the gas conduit 219. The supply of pressurized gas is ended by closing the third valve 227.

After the sample chamber 215 has been emptied completely, another sample can then be taken.

Especially in the case of a hot gaseous reaction product, it is advantageous when the sample vessel is heatable. For this purpose, preference is given to using an electrical heater 229. The electrical heating can be implemented, for example, by means of heating coils surrounding the sample vessel 37. Alternatively, it is also possible to use a heating jacket.

For control of the movement of the piston 217, position sensors are preferably provided. A first position sensor 231 detects whether the piston 217 is in the first position, and a second position sensor 233 whether the piston 217 is in the second position. The position sensors 231, 233 are especially utilized in order to control the movement of the piston by application of reduced pressure or elevated pressure. If a sample is taken, the removal of gas to generate a pressure below the pressure of the gaseous reaction product is ended when the second position sensor 233 detects that the piston 217 has reached its second position. Accordingly, the pressurized gas supply in the removal of the sample from the sample chamber 15 is ended when the first position sensor 231 detects that the piston 217 has reached its first position.

As an alternative to the above-described embodiment with pneumatic movement of the piston 217, it is also possible for the piston to be moved hydraulically. In this case, rather than a gas, a fluid is used, which is sucked out of the sample vessel 37 when the piston 217 is to move into the second position, and forced into the sample vessel 37 in order to move the piston into its first position.

As well as the pneumatically or hydraulically assisted movement of the piston, movement of the piston is alternatively also possible with the aid of a drive, for example with a step motor. When a step motor is used, it is directly also possible to detect the position of the piston, such that the position sensors 231, 233 can be dispensed with in this case. When a drive that does not permit determination of the piston position is used for piston, however, the use of the position sensors 231, 233 is advantageous in order to end the movement of the piston in the respective direction by stopping the drive as soon as the corresponding position sensor 231, 233 has detected the piston.

FIG. 7 shows a sample vessel with pressure control.

In order to facilitate sampling a vacuum pump 243 is provided in the embodiment shown in FIG. 7. The vacuum pump 243 can be used to apply a pressure lower than the pressure in the separator to the side of the piston 217 remote from the sample chamber 215. As a result, with the first valve 211 open, gaseous reaction product is sucked into the sample chamber 215. The vacuum pump 243 is especially advantageous when the reaction is performed under ambient pressure or a pressure below ambient pressure. When the reaction is performed at a pressure above ambient pressure, in general, one outlet to the environment is sufficient, since, in this case, the positive pressure of the gaseous reaction product forces the gaseous reaction product into the sample chamber 215 and moves the piston 217 upward. In order to prevent the piston from being forced upward too quickly, it is possible in this case either to provide the piston with a weight or preferably to insert a valve in the outlet to the environment that can be opened only to such an extent that the piston is raised at the desired speed. A construction as shown in FIG. 6 is sufficient for this purpose.

In order that the gaseous reaction product can also be withdrawn from the sample chamber 215, as described above, a positive pressure is then applied to the opposite side of the piston 217 from the sample chamber 215, such that the piston 217 is forced in the direction of the sample chamber 215 and hence the mixture present in the sample chamber 215 is guided out of the sample chamber 215 through the measurement conduit 223 to the analysis unit 221.

For control of the piston 217, in the embodiment shown in FIG. 7, a controllable valve 245 is accommodated in the gas conduit 219. For this purpose, the pressure is measured in the gas conduit 219 between the sample vessel 37 and the controllable valve 245, and the valve is controlled with a pressure regulator 247. When the pressure measured in the gas conduit 219 differs from the desired pressure, the controllable valve 245 is set correspondingly. The controllable valve 245 is opened further if if too low a pressure is measured, and closed further if too high a pressure is measured. If too low a pressure is measured, during the sampling, the piston 217 is moved too quickly into its second position and the volume of the sample chamber 215 is increased; when the piston 217 is moved into its first position, the piston 217 is moved too slowly and the gaseous reaction product present in the sample chamber 215 is guided too slowly from the sample chamber 215 into the analysis unit 221. If too high a pressure is measured, during the sampling, the piston 217 is moves too slowly, such that the sampling is not fast enough, or the pressure that acts on the piston 217 is even so high that it does not move and hence no sample is taken. When the piston 217 is moved into its first position, the effect of an excessively high pressure is excessively rapid movement in the first position, such that the gaseous reaction product is displaced too quickly from the sample chamber 215.

In order to analyze the progression of the reaction over a longer period or to take a plurality of separate samples from a plurality of consecutive reactions a plurality of sample vessels which can each consecutively accommodate one sample are connected to the sample conduit 209. This is shown by way of example in FIG. 8.

In order to allow consecutive withdrawal of a plurality of samples from the reactor, sample conduit 209 is connected to plurality of sample vessels 37 via a multiway valve 249. Instead of a multiway valve it is also possible, as shown in FIG. 3, to utilize a distributor channel 51 to which the sample vessels 37 are connected. A 3-way valve 251 may also be arranged upstream of the multiway valve 249. The 3-way valve 251 is utilized to establish a connection either from the liquid separator 31 to the sample vessels 37 or alternatively from the sample vessels 37 to the analysis unit 221. In order to be able to take a sample, the 3-way valve 251 is adjusted such that a connection from the liquid 31 the multiway valve 249 is open, and the connection for the multiway valve 249 to the analysis unit 221 is closed. The multiway valve 249 is then used to open the connection to the respective sample vessel 37 that is to be filled during the sampling. Accordingly, for the analysis of the samples present in the sample vessel 37, the 3-way valve 251 is connected such that the connection from the 3-way valve 251 to the analysis unit 221 is open and, by the multiway valve 249, the connection to the sample vessel 37 from which the desired sample is to be taken and guided to the analysis unit 221.

With the multiway valve 249, it is possible in a simple manner to successively take multiple samples by, after sampling into the sample vessel 37 has ended, switching over the multiway valve 249 and opening the connection to the next sample vessel 37. This can be repeated until samples are present in all sample vessels 37. Accordingly, it is then also possible to supply the samples from the individual sample vessels 37 successively to the analysis unit 221 by, in the course of sampling too, switching over the multiway valve 249 to a further sample vessel 37 as soon as a sample vessel 37 has been emptied. In order to assist the movement of the pistons 217 in the sample vessels, each sample vessel 237 is connected to a gas conduit 219 here too, such that—as described above for FIGS. 6 and 7—the movement of the piston 217 can be assisted by application of pressure on the side remote from the sample chamber 215 or by application of a reduced pressure on the side remote from the sample chamber 215. In this case, it is possible to simultaneously exert the pressure on all pistons or simultaneously to apply reduced pressure to all pistons 217, since only in the sample vessel 37 to which the connection through the multiway valve 49 is open is it possible to move the piston 217 for accommodation of a sample or for emptying. In the other sample vessels, owing to the closed connection, a pressure equilibrium is established, which prevents the movement of the piston.

Here too, the third valve 227 is accommodated in the gas conduit 219 through which the gas is guided to assist the piston movement. The valve may be provided with a pressure gauge 252 in order thus to have control over whether a sample vessel 37 is currently being filled or emptied. In the case of a pressure below the reactor pressure, a sample vessel 37 is being filled, and, in the case of a pressure above the reactor pressure, the sample from a sample vessel 37 is being supplied to the analysis unit 221.

FIG. 9 shows a further evaluation unit having a plurality of sample vessels and a plurality of analysis units.

The embodiment shown in FIG. 9 differs from that shown in FIG. 8 by a second multiway valve 253 by means of which a plurality of liquid separators may be connected to the liquid vessels 37. In this case the multiway valve 253 can be used instead of the collector shown in FIG. 3. Via the second multiway valve 253 the gaseous reaction product passes into 3-way valve 251 and, via said valve, as per the embodiment in FIG. 8, to the multiway valve 249 and from there into the sample vessel 37 to which the connection has been opened. The multiway valve 249 then makes it possible to take a plurality of samples consecutively. It is alternatively also possible in the case of a plurality of consecutively performed reactions to take only one sample in each reactor. In this case, after the taking of a sample, both multiway valves 249, 253 are switched to open the connection from a further liquid separator 31 to a further sample vessel 37. This can be repeated until samples have been taken from all liquid separators and all sample chambers 215 contain a sample.

Unlike the embodiments described above for FIGS. 6 to 8, the analysis region comprises multiple analysis units 261, 265. For this purpose, multiple 3-way valves 259, 263 are accommodated in the measurement conduit 223. It is possible either for each 3-way valve 259, 263 to be used to open a connection to an analysis unit 261, 265 or for a connection to be opened to a downstream 3-way valve or an outlet 257. For example, it is possible first to switch the first 3-way valve 259 such that the gaseous reaction product is supplied to the first analysis unit 261. Subsequently, the first 3-way valve 259 is switched such that the gaseous reaction product is guided past the first analysis unit 261 to the second 3-way valve 263. The second 3-way valve 263 is there switched such that the gaseous reaction product is guided into the second analysis unit 265. If no sample is to be taken, both 3-way valves 259, 263 are switched such that the gaseous reaction product passes to the outlet 257. It is also possible here to guide a sample only to one analysis unit 261, 265 in each case, the analysis unit 261, 265 utilized being dependent on the analysis to be conducted. In addition, it is also possible, especially in the case of longer-lasting analyses, to supply a sample to the first analysis unit 261 and, while the sample is still being analyzed, a further sample from another sample vessel of the second analysis unit 265. If the analyses take a very long time, it is also possible for acceleration of the analyses to use further analysis units that can each be operated in parallel.

EXAMPLES

In order to provide an exemplary illustration of the process according to the invention a plurality of catalytic cracking reactions were investigated.

When performing the analyses an apparatus having a vertically oriented tubular reactor was employed, wherein a first series of experiments employed a construction as shown in FIG. 1 in which the catalyst flows from top to bottom and a second series of experiments employed a construction as shown in FIG. 4 in which the catalyst flows from bottom to top.

The reactor had a length of 1.7 m and an internal diameter of 9.5 mm. The analyses were performed at a reactor temperature of 530° C., wherein the reported temperature relates to the temperature at the outlet of the reactor.

To perform the experiments the catalyst was filled into the catalyst reservoir container. The catalyst employed was a pre-calcined E-Cat that had previously been sieved to remove coarse-grained particles having a size of 200 μm or larger. The catalyst reservoir container employed here had an internal volume of 1 L. The catalyst reservoir container is provided with a heating apparatus, wherein the catalyst reservoir container has a conical outlet funnel in the lower portion which has a porous surface. The outer surface of the porous region is functionally connected to a gas feed. The supply of gas through the porous region makes it possible to store the catalyst in a fluidized state in the container. In the analyses performed here the catalyst was stored in the catalyst reservoir container at a temperature of 700° C.

The injection unit was initially calibrated to inject the oil employed as reactant into the reactor at a constant metering rate of 7 g/min. The employed oil had a specific density of 0.9042 g/cm$^3$, a sulfur content of 0.8% by weight, a UOPK factor of 11.94 and a CCR content of 0.19% by weight. The CCR content (Conradson carbon residue, also referred to as "Concarbon" or "CCR") is a laboratory test used to characterize the coking tendency of an oil. Table 1 shows the fractions resulting from a distillation.

TABLE 1

Composition of heavy oil by fractions

| Temperature [C.] | Evaporated proportion [%] |
|---|---|
| 329 | 10 |
| 385 | 30 |
| 423 | 50 |
| 471 | 70 |
| 525 | 90 |

To perform the catalytic cracking reactions the catalyst and the oil are brought into contact in the inlet region of the reactor, wherein in each case a cracking is performed at a previously specified ratio of catalyst to employed reactant (hereinbelow "catalyst to oil ratio"). The catalyst to oil ratio is adjusted by specifying and varying the metering rate of supplied catalyst, wherein the catalyst and the oil are passed through the reactor for a defined duration and transferred into the separation apparatus for the catalyst. The duration for passing the catalyst through the catalyst was chosen as 1 minute for each experiment. The residence time of the catalyst and the oil in the reactor was in the range from about 2 to 3 seconds.

A total of thirteen crackings were performed with the fluidized bed reactor, wherein five crackings were performed in upwardly transported operation and eight crackings were performed in downwardly transported operation. Catalyst to oil ratios were in the range from 5.4 to 13.5 for analyses in downwardly transported operation and in the range from 9 to 15 for analyses in upwardly transported operation. Accordingly the amounts of employed catalyst in the analyses in downwardly transported operation were in the range from 38 g to 95 g and in the analyses in upwardly transported operation were in the range from 63 g to 105 g. It should be noted here that the analyses in upwardly transported operation are limited in the catalyst to oil ratio by the fact that a portion of the transport energy for conveying the catalyst is provided by the cracking products. A catalyst to oil ratio in the range of 15 or 20 is at the limit since otherwise insufficient amounts of gaseous products are present to drive the catalyst upwards. The crackings were performed at a pressure of 2.5 bar, wherein the pressure for the gaseous reaction product was controlled via the pressure control valve between the liquid separator and the sample vessel The catalyst is collected in the separation apparatus and the stripping/removal of the cracking products and unconverted reactants already begins during collection of the first portion of the catalyst inside the separation apparatus.

After conclusion of the cracking reaction the stripping of the volatile components on the catalyst collected in the separation apparatus is continued for a further duration of 10 minutes, wherein stripping was performed using a dry nitrogen stream at a flow rate of 1 liter per minute. The stripping gas was passed initially from the separation apparatus through the liquid separator and subsequently via a conduit provided with a control valve to a sample vessel. In the present case the sample vessel was configured such that a gas volume of 15 liters was able to be collected. After each experiment both the mass of the catalyst material collected in the separation apparatus and the amount of liquid collected in the liquid separator were determined by weighing.

Furthermore, the amount of gas volume collected in the sample vessel was determined. The amount of coke deposited on the catalyst was also determined.

The experiments were evaluated by performing an analytical characterization of the liquids and gases by gas chromatography. The results of these analyses are shown in FIGS. 10 to 12, wherein measurement points for a reactor with catalyst flowing from top to bottom and for a reactor with catalyst flowing from bottom to top were in each case used to plot an approximation curve.

FIG. 10 shows the catalyst to oil ratio 301 on the abscissa and the conversion 303 on the ordinate. A reactor with catalyst flowing from bottom to top, represented by unshaded circles 305, achieves a slightly higher conversion than a reactor with catalyst flowing from top to bottom, represented by shaded rhombi 307, at identical catalyst to oil ratio. For the individual experiments, in each case only the catalyst to oil ratio was varied while the other process conditions (pressure, temperature and amount of inert gas) were kept constant.

The conversion shown in FIG. 10 is the yield of light cycle oil (LCO) obtained during fluid catalytic cracking based on the employed amount of heavy oil. Conversion refers to the sum of obtained gases, gasoline and coke, wherein gasoline is to be understood as meaning all components having a boiling point in the range from 28° C. to 216° C.

The higher conversion in the case of a catalyst 305 flowing from bottom to top is in particular a consequence of the longer residence time of the catalyst in the reactor. This results from the lower velocity at which the catalyst is transported upwards with the gases flowing through the reactor. In the case of a catalyst flowing from top to bottom the movement is in particular a consequence of the gravitational force. Both in the reactor with catalyst flowing from top to bottom and in the reactor with catalyst flowing from bottom to top, the catalyst and the reactants are supplied in cocurrent.

In FIG. 11 the yield of gasoline is reported as a function of conversion, wherein the conversion 303 is here shown on the abscissa and the yield of gasoline 309 on the ordinate. It is apparent that a reactor with catalyst 305 flowing from bottom to top achieves a lower yield of gasoline at higher conversion while a reactor with catalyst 307 flowing from bottom to top achieves a higher yield of gasoline at lower conversion. The conversion corresponds to that shown in FIG. 10 as a function of the catalyst oil ratio.

A similar result is also apparent from the yield of propene from the employed oil which is shown in FIG. 12. The yield 311, shown on the ordinate, is here defined as the yield of propene divided by the sum of the yield of propene and the yield of propane. Since propene is a value product, employed for example in the production of polypropylene, a highest possible yield of propene is desired.

Here too, it is apparent that a reactor with catalyst flowing from top to bottom 307 achieves a higher yield at lower conversion than a reactor with catalyst flowing from bottom to top 305.

The lower yields of gasoline and of propene in the reactor with catalyst flowing from bottom to top are also a consequence of the longer residence time. Once a maximum conversion to the corresponding products has occurred, a longer residence time results in a further reaction where the gasoline is cracked further to afford shorter-chain hydrocarbons and the propene is further hydrogenated to afford propane.

| List of reference numerals | |
|---|---|
| 1 | apparatus for analyzing heterogeneously catalyzed reactions |
| 3 | reactor |
| 5, 5' | catalyst reservoir container |
| 7 | preheating zone |
| 9 | first valve |
| 11 | reactant reservoir container |
| 12 | feed |
| 13 | pump |
| 15 | connecting conduit |
| 17 | separation apparatus |
| 19 | functional connection |
| 21 | differential pressure controller |
| 23 | valve |
| 25 | connecting conduit to separation apparatus |
| 27 | connecting conduit to catalyst reservoir container |
| 29 | pressure sensor |
| 31 | liquid separator |
| 33 | filter |
| 35 | cooling bath |
| 37 | sample vessel |
| 39 | catalyst withdrawal apparatus |
| 41 | sample vessel |
| 43 | carousel |
| 45 | distributor channel |
| 47 | valve |
| 49 | collector |
| 51 | distributor channel |
| 53 | pipe arc |
| 103 | metallic tube |
| 105 | first end |
| 107 | second end |
| 109 | removable cover |
| 111 | sealing element |
| 113 | gas outlet |
| 115 | droplet separator |
| 117 | axis |
| 119 | deflection body |
| 121 | baffle plate |
| 123 | side pointing to first end 105 |
| 125 | side pointing to second end 107 |
| 127 | gap |
| 129 | edge |
| 131 | inner wall |
| 133 | feed conduit |
| 135 | side feed |
| 137 | lower end |
| 139 | liquid outlet |
| 141 | valve |
| 207 | outflow conduit |
| 209 | sample conduit |
| 211 | first valve |
| 215 | sample chamber |
| 217 | piston |
| 219 | gas conduit |
| 221 | analysis unit |
| 223 | measurement conduit |
| 225 | second valve |
| 227 | third valve |
| 229 | heater |
| 231 | first position sensor |
| 233 | second position sensor |
| 243 | pump |
| 245 | controllable valve |
| 247 | pressure regulator |
| 249 | multiway valve |
| 251 | 3-way valve |
| 252 | pressure gauge |
| 253 | second multiway valve |
| 255 | common mixer |
| 257 | outlet |

The invention claimed is:

1. An apparatus for analyzing heterogeneously catalyzed reactions, comprising:
a tubular reactor through which, in operation, a particulate catalyst flows from top to bottom; and
a reactant feed;
wherein:
arranged downstream of the tubular reactor is a separation apparatus for separating the particulate catalyst from a reaction product comprising condensable gases;
the separation apparatus is connected to a catalyst withdrawal apparatus configured to transfer the particulate catalyst into sample vessels arranged on a carousel;
the separation apparatus is further connected to a distributor channel to which a plurality of liquid separators are connected, the liquid separators being configured to separate liquid constituents from the reaction product;
each liquid separator comprises a metallic tube and a deflection body, wherein the metallic tube is closed at its ends, the deflection body is accommodated in the metallic tube, and the metallic tube comprises a side feed at a first end and a gas outlet at a second end; and
the liquid separators are connected to sample vessels for accommodating the gaseous reaction product such that at least one of the following is achieved:
the gas outlet of one liquid separator is connected to one sample vessel for accommodating the gaseous reaction product;
the gas outlets of a plurality of the liquid separators are connected to a plurality of the sample vessels for accommodating the gaseous reaction product via a further distributor channel; and
at least one of the liquid separators is connected to at least one of the sample vessels for accommodating the gaseous reaction product such that, for each of these liquid separators, one of the liquid separators is connected with one of the sample vessels for accommodating the gaseous reaction product, and a plurality of the remaining liquid separators are connected to a plurality of the sample vessels for accommodating the gaseous reaction product via the further distributor channel.

2. The apparatus according to claim 1, comprising at least one selected from the group consisting of:
a catalyst reservoir container, from which the particulate catalyst is supplied to the tubular reactor via a metering point; and
a catalyst circuit configured to return the catalyst separated in the separation apparatus to the metering point.

3. The apparatus according to claim 2, wherein:
the catalyst reservoir container is present;
the catalyst reservoir container and the separation apparatus have a functional connection provided with a differential pressure controller that actuates a continuously acting valve; and
an outlet side of the continuously acting valve has either a connecting conduit to the separation apparatus or an exhaust air conduit and/or a pressure control valve is arranged in a functional connection between the liquid separator and the sample vessel.

4. The apparatus according to claim 1, wherein each sample vessel has an adjustable volume.

5. The apparatus according to claim 1, wherein the apparatus comprises at least one tubular reactor and in an apparatus having one tubular reactor, the tubular reactor is connected to at least two sample vessels and in an apparatus having more than one tubular reactor each tubular reactor is connected to at least one sample vessel.

6. The apparatus according to claim 1, wherein each tubular reactor is aligned at an angle in the range from 45° to 90° to the horizontal.

7. The apparatus according to claim 6, wherein each tubular reactor has a length in a range from 0.3 to 3 m and a diameter in a range from 3 to 100 mm.

8. The apparatus according to claim 1, wherein all of the liquid separators are connected to a plurality of sample vessels for accommodating the gaseous reaction product via the further distributor channel.

9. The apparatus according to claim 1, wherein each liquid separator comprises a droplet separator positioned between the deflection body and the gas outlet.

10. The apparatus according to claim 1, wherein each deflection body comprises a central axis and 1 to 20 deflection plates.

11. The apparatus according to claim 1, wherein each liquid separator comprises a feed conduit that is connected to the side feed and wraps helically around the metallic tube.

12. A process for analyzing heterogeneously catalyzed reactions, comprising:
    (a) adding liquid and/or gaseous reactants and a particulate catalyst to the tubular reactor of the apparatus according to claim 1;
    (b) reacting the liquid and/or gaseous reactants in the presence of the particulate catalyst in the reactor to form a gaseous reaction product comprising condensable and/or liquid components;
    (c) separating the particulate catalyst from the gaseous reaction product comprising condensable and/or liquid components;
    (d) optionally cooling the gaseous reaction product comprising condensable and/or liquid components to condense the condensable components;
    (e) separating the condensed and/or liquid components in at least one of the liquid separators;
    (f) withdrawing a sample of the gaseous reaction product into one of the sample vessels after separation of the condensed and/or liquid components at a predetermined time, wherein a sample is withdrawn or pulsed withdrawal of samples is effected from the gaseous reaction product of the tubular reactor at the predetermined time, wherein each withdrawal pulse introduces a sample of the gaseous reaction product into a further sample vessel;
    (g) analyzing the samples present in the sample vessels; and
    (h) optionally weighing each of the liquid separators to determine the mass of the separated condensable and/or liquid components.

13. The process according to claim 12, wherein the particulate catalyst is supplied from a catalyst reservoir container.

14. The process according to claim 13, wherein the particulate catalyst in the catalyst reservoir container is preheated.

15. The process according to claim 12, wherein the catalyst has a residence time in the tubular reactor in the range from 0.1 to 10 s.

16. The process according to claim 12, wherein at least one liquid or gaseous reactant is added and the mass ratio of catalyst to reactant is in the range from 1 to 100.

17. The process according to claim 12, wherein the heterogeneously catalyzed reaction is a catalytic cracking reaction.

* * * * *